US009457318B2

(12) United States Patent
Linder et al.

(10) Patent No.: US 9,457,318 B2
(45) Date of Patent: Oct. 4, 2016

(54) ANION EXCHANGE MEMBRANES, METHODS OF PREPARATION AND USES

(75) Inventors: Charles Linder, Rehovot (IL); Ora Kedem, Haifa (IL); Rami Messalem, Omer (IL)

(73) Assignee: Ben-Gurion University of the Negev Research and Development Authority, Beer-Sheva (IL)

( * ) Notice: Subject to any disclaimer, the term of this patent is extended or adjusted under 35 U.S.C. 154(b) by 331 days.

(21) Appl. No.: 13/993,582

(22) PCT Filed: Dec. 12, 2011

(86) PCT No.: PCT/IL2011/050064
§ 371 (c)(1),
(2), (4) Date: Jul. 10, 2013

(87) PCT Pub. No.: WO2012/081026
PCT Pub. Date: Jun. 21, 2012

(65) Prior Publication Data
US 2013/0292252 A1    Nov. 7, 2013

Related U.S. Application Data

(60) Provisional application No. 61/422,173, filed on Dec. 12, 2010.

(51) Int. Cl.
*B01D 61/44* (2006.01)
*C08J 5/22* (2006.01)
*B01J 41/12* (2006.01)

(52) U.S. Cl.
CPC ............. *B01D 61/44* (2013.01); *B01J 41/125* (2013.01); *C08J 5/2256* (2013.01); *C08J 2381/06* (2013.01)

(58) Field of Classification Search
USPC ................................ 521/27, 30; 204/630
See application file for complete search history.

(56) References Cited

U.S. PATENT DOCUMENTS 3,402,144 A    9/1968    Hay
3,516,791 A    6/1970    Evans
3,556,305 A    1/1971    Shorr (Continued)

FOREIGN PATENT DOCUMENTS

DE    102004063215    2/2007
EP    0152161    8/1985

(Continued)

OTHER PUBLICATIONS

Alberti and Casciola (1997) Layered metalIV phosphonates, a large class of inorgano-organic proton conductors. Solid State Ionics 97(1-4): 177-186.

(Continued)

*Primary Examiner* — Peter D Mulcahy
*Assistant Examiner* — Henry Hu
(74) *Attorney, Agent, or Firm* — Rodney J. Fuller; Booth Udall Fuller, PLC

(57) ABSTRACT

The present invention provides anion exchange membranes, processes for producing same and uses thereof. The anion exchange membranes according to embodiments of the present invention achieve a desirable combination of low resistance, high permselectivity and low degree of dimensional swelling. Anion exchange membranes according to embodiments of the present invention are also cost effective.

15 Claims, 2 Drawing Sheets

(56) References Cited

U.S. PATENT DOCUMENTS

| | | | |
|---|---|---|---|
| 3,567,810 A | 3/1971 | Baker | |
| 3,615,024 A | 10/1971 | Michaels | |
| 3,639,337 A | 2/1972 | Klebe | |
| 3,812,224 A | 5/1974 | Smith | |
| 3,840,646 A | 10/1974 | Sugimoto | |
| 3,989,981 A | 11/1976 | Ogle | |
| 4,029,582 A | 6/1977 | Ishii | |
| 4,042,496 A * | 8/1977 | Tsushima et al. | 205/520 |
| 4,188,354 A | 2/1980 | Bottino | |
| 4,247,498 A | 1/1981 | Castro | |
| 4,256,596 A | 3/1981 | Cohen | |
| 4,273,903 A | 6/1981 | Rose | |
| 4,413,106 A | 11/1983 | Coplan | |
| 4,466,931 A | 8/1984 | Tanny | |
| 4,468,501 A | 8/1984 | Zampini | |
| 4,477,634 A | 10/1984 | Linder | |
| 4,504,852 A | 3/1985 | Ducret | |
| 4,508,832 A | 4/1985 | Carter | |
| 4,508,852 A | 4/1985 | Bikson | |
| 4,584,103 A | 4/1986 | Linder | |
| 4,598,137 A | 7/1986 | Guiver | |
| 4,604,204 A | 8/1986 | Linder | |
| 4,657,990 A | 4/1987 | Daoust | |
| 4,690,765 A | 9/1987 | Linder | |
| 4,767,645 A | 8/1988 | Linder | |
| 4,781,733 A | 11/1988 | Babcock | |
| 4,797,187 A | 1/1989 | Davis | |
| 4,797,457 A | 1/1989 | Guiver | |
| 4,839,203 A | 6/1989 | Davis | |
| 4,889,636 A | 12/1989 | Perry | |
| 4,894,159 A | 1/1990 | Guiver | |
| 4,990,252 A | 2/1991 | Tomaschke | |
| 5,013,765 A | 5/1991 | Sluma | |
| 5,028,337 A | 7/1991 | Linder | |
| 5,032,282 A | 7/1991 | Linder | |
| 5,039,421 A | 8/1991 | Linder | |
| 5,068,070 A | 11/1991 | Gunji | |
| 5,071,448 A | 12/1991 | Bikson | |
| 5,128,378 A | 7/1992 | Sugaya | |
| 5,151,182 A | 9/1992 | Perry | |
| 5,173,542 A | 12/1992 | Lau | |
| 5,227,457 A | 7/1993 | Marrocco, III | |
| 5,288,385 A * | 2/1994 | Kedem et al. | 204/631 |
| 5,348,569 A | 9/1994 | Bikson | |
| 5,364,454 A | 11/1994 | Bikson | |
| 5,438,082 A | 8/1995 | Helmer-Metzmann | |
| 5,625,010 A | 4/1997 | Gagne | |
| 5,660,709 A | 8/1997 | Bauer | |
| 5,670,564 A | 9/1997 | Gagne | |
| 5,766,528 A | 6/1998 | Su | |
| 5,814,672 A * | 9/1998 | Kiyokawa | C08F 8/44 521/25 |
| 5,886,130 A | 3/1999 | Trimmer | |
| 5,922,203 A | 7/1999 | Tomaschke | |
| 6,086,764 A | 7/2000 | Linder | |
| 6,090,258 A * | 7/2000 | Mirsky et al. | 204/636 |
| 6,090,895 A | 7/2000 | Mao | |
| 6,103,414 A | 8/2000 | Cabasso | |
| 6,214,488 B1 | 4/2001 | Helmer-Metzmann | |
| 6,509,441 B1 | 1/2003 | Kerres | |
| 6,632,847 B1 | 10/2003 | Soczka-Guth | |
| 6,780,893 B2 * | 8/2004 | Sugaya | C08L 81/06 521/27 |
| 7,550,216 B2 | 6/2009 | Ofer | |
| 2002/0045085 A1 | 4/2002 | Formato | |
| 2002/0045729 A1* | 4/2002 | Kerres et al. | 528/391 |
| 2004/0242807 A1 | 12/2004 | Weber | |
| 2005/0031925 A1 | 2/2005 | Ofer | |
| 2005/0031928 A1 | 2/2005 | Ishizone | |
| 2005/0238937 A1 | 10/2005 | Oren | |
| 2005/0261459 A1 | 11/2005 | Marrocco, III | |
| 2006/0008697 A1 | 1/2006 | Kim | |
| 2006/0036064 A1 | 2/2006 | McGrath | |
| 2006/0047095 A1 | 3/2006 | Pacetti | |
| 2007/0163951 A1 | 7/2007 | McGrath | |
| 2012/0178834 A1 | 7/2012 | Linder | |

FOREIGN PATENT DOCUMENTS

| | | |
|---|---|---|
| EP | 0489693 | 6/1992 |
| GB | 2000720 | 1/1979 |
| IL | 120635 | 4/1997 |
| JP | H0268146 | 3/1990 |
| JP | H0680799 | 3/1994 |
| JP | H06172559 | 6/1994 |
| JP | H06271688 | 9/1994 |
| JP | 2000072965 | 3/2000 |
| JP | 2000309707 | 11/2000 |
| WO | 99/40996 | 8/1999 |
| WO | 2009/077992 | 6/2009 |
| WO | 2010/095139 | 8/2010 |

OTHER PUBLICATIONS

Bierenbaum et al., (1974) Microporous Polymeric Films Ind Eng Chem Prod Res Dev 13(1): 2-9.

Daly WH, Lee S and Rungaroonthaikul C, "Modification of Condensation Polymers" In: Chemical Reactions on Polymers, Chapter 1, pp. 4-23, ACS Symposium Series, vol. 364, 1988.

Fritsch et al., (2002) Syntheses of branched poly(ether Ketones)s with pendant functional groups based on 1,1,1-tris(4-hydroxyphenyl)ethane. J of Macromolecular science A 39(11): 1335-1347.

Hoffer and Kedem (1968) Negative rejection of acids and separation of ions by hyperfiltration. Desalination 5(2): 167-172.

Kedem et al.(1998), Low-polarisation electrodialysis membranes. Desalination 118(1-3): 305-314.

Kim and Webster (1992) Hyperbranched polyphenylenes. Macromolecules 25 (21): 5561-5572.

Kopitzke (1998) Sulfonation of a poly(phenylquinoxaline) film. Journal of Polymer Science Part A: Polymer Chemistry 36(7): 1197-1199.

Kovacic and Jones (1987) Dehydro coupling of aromatic nuclei by catalyst-oxidant systems: poly(p-phenylene). Chem Rev 87(2): 357-379.

Kricheldorf et al., (2002) Synthesis and functionalization of poly(ether sulfone)s based on 1,1,1-tris(4-hydroxyphenyl)ethane. Journal of Polymer Science Part A: Polymer Chemistry 40(17): 2967-2978.

Lee et al., (2011) Novel glycerol cross-linked poly(acrylic acid) hydrogel for encapsulation and release of benzocaine. Philippino Science Letters 4(2): 81-87.

Linder and Kedem (2001) Asymmetric ion exchange mosaic membranes with unique selectivity. Journal of Membrane Science 181(1): 39-56.

Litter and Marvel (1985) Polyaromatic ether-ketones and polyaromatic ether-ketone sulfonamides from 4-phenoxybenzoyl chloride and from 4,4'-dichloroformyldiphenyl ether Journal of Polymer Science: Polymer Chemistry Edition 23(8): 2205-2223.

Oren et al., (2002) Modified Heterogeneous Anion-Exchange Membranes for Desalination of Brackish and Recycled Water No Access. Environmental Engineering Science19(6): 512-529.

Patel et al., (2009) Preparation and characterization of proton conducting polysulfone grafted poly(styrene sulfonic acid) polyelectrolyte membranes. J Industrial and Engineering Chem 15(3): 299-303.

Perry and Linder (1989) Intermediate reverse osmosis ultrafiltration (RO UF) membranes for concentration and desalting of low molecular weight organic solutes. Desalination 71(3): 233-245.

Saito et al., (2004) Oxidative polymerization of 2,6 dimethylphenol to form Poly(2,6 dimethyl-1,4-phenylene oxide) in Water. Angew Chem Int Ed Engl 43(6): 730-733.

Sata (2000) Studies on anion exchange membranes having permselectivity for specific anions in electrodialysis—effect of hydrophilicity of anion exchange membranes on permselectivity of anions. Journal of Membrane Science 167(1): 1-31.

Uchimoto et al., (1990) Ionically conductive thin polymer films prepared by plasma polymerization. Part 7. Preparation and char-

(56) References Cited

OTHER PUBLICATIONS acterization of solid polymer electrolyte having fixed carboxylic acid groups with single mobile species. Solid State Ionics 40-41(2): 624-627.

Xu et al., (2002) Doping level increase of poly(3-methylthiophene) film during electrochemical polymerization process. Chinese Journal of Polymer Science 20(5): 425-430.

Yang et al., (2004) Synthesis of poly[arylene ether sulfone-b-vinylidene fluoride] block copolymers. European Polymer Journal 40(3): 531-541.

Yang et al., (2004) Synthesis of Sulfonated Polysulfone-block-PVDF Copolymers: Enhancement of Proton Conductivity in Low Ion Exchange Capacity Membranes. Macromolecules 37(5): 1678-1681.

* cited by examiner

1

ANION EXCHANGE MEMBRANES, METHODS OF PREPARATION AND USES

RELATED APPLICATION DATA

This application is the U.S. National Stage of International Application No. PCT/IL2011/050064, filed Dec. 12, 2011, which claims the benefit of U.S. Provisional Application No. 61/422,173, filed Dec. 12, 2010, the contents of each of which are herein expressly incorporated by reference for all purposes.

FIELD OF THE INVENTION

The present invention generally relates to the field of membranes. Specifically, the present invention relates to anion exchange membranes, methods for producing same and uses thereof.

BACKGROUND OF THE INVENTION

Ion exchange membranes are widely used in electro-membrane processes, including, for example, electrodialysis, Donnan dialysis and diffusion dialysis. Efficient electro-membrane processes require ion exchange membranes with a combination of properties such as high permselectivity, low resistance, high chemical stability and good shape stability, also referred to as controllable swelling.

Ion exchange membranes may be produced by incorporation of ion exchange material into an inert matrix, obtaining heterogeneous membranes. Alternatively, homogeneous membranes may be prepared, that consist of a single polymer or polymer mixtures carrying ionizable groups. Surface coating of ion exchange membranes is sometimes used to achieve univalent ion selectivity (see for example Toshikatsu Sata (2000), Journal of Membrane Science, Vol. 167 pp. 1).

Anion exchange membranes (AEM) are those that reject certain positively charged solutes and allow neutral molecules or negatively charged solutes to pass the membrane. For example, ionomers with anion exchange groups may be used for the preparation of the membrane. The anion exchange groups may be chosen, for example, from quaternary ammonium, phosphonium and sulfonium.

Ionomers with anion exchange groups may be made by derivatizing aromatic condensation polymers, such as polysulfone, polyethersulfone and polyetherketone, to form e.g. halomethylated polymers, which are converted to quaternary ammonium, phosphonium and sulfonium derivatives. Examples of such ionomers include halomethylated engineering plastics, such as bromomethylated polysulfone or polyethersulfone, which may be reacted with tertiary amines and multifunctional amines to introduce crosslinking (Kedem and Warshaysky, U.S. Pat. No. 5,288,385). These membranes are not considered to be cost effective, as halomethylation of the above polymers is very expensive and the resulting ionomers swell at the ion exchange capacities needed to achieve good conductivity.

Other examples of homogeneous anion exchange membranes include insoluble polymer sheets, such as crosslinked polystyrene that are halomethylated and subsequently aminated to give quaternary amine groups, and films comprising partly aminated poly-4-vinylpyridine crosslinked with dibromo or chloro alkanes, which also quaternizes the remaining pyridine groups. These membranes cannot achieve a combination of good selectivity and low resistance without substantial swelling. In addition, when dry, the membranes are mechanically weak and brittle. Thus, most such membranes are made in combination with a net or porous support, which is embedded in the final polymer film. However, the supported dry membranes are still brittle when dry and increase in length/width when wetted.

Crosslinking is an important aspect of anion exchange membranes. For example, a crosslinked structure obtained by reacting a chloromethylated product of a polysulfone type polymer with a polyamine has been proposed (JP Patent No. JP-A-2-68146), and an anion exchange membrane having such a crosslinked structure and characterized by good corrosion resistance has also been proposed (JP Patent Nos. JP-A-6-80799, JP-A-6-172559 and JP-A-6-271688).

Other examples of crosslinked membranes include the membranes described in U.S. Pat. No. 6,780,893, which discloses, inter alia, a process for producing an anion exchange membrane, which comprises mixing from 25 to 95 mass % of a polymer having anion exchange groups or active groups convertible to anion exchange groups ("polymer 1"), and from 5 to 75 mass % of a polymer having no anion exchange groups or no active groups convertible to anion exchange groups ("polymer 2"), and forming the obtained composition into a membrane, said process including a step of cross-linking an aromatic ring of a repeating unit constituting polymer 1 with an aromatic ring of another repeating unit constituting polymer 1 or with a cross-linkable site of polymer 2, and in a case where polymer 1 is a polymer having active groups convertible to anion exchange groups, a step of converting the active groups to anion exchange groups.

U.S. Pat. No. 6,780,893 describes, inter alia, anion exchange membranes which are based on haloalkylated aromatic polymers, such as haloalkylated polysulfone, polyetherketone and polyphenylene oxide type polymers.

Crosslinking described in U.S. Pat. No. 6,780,893 may be brought about by a primary or secondary amine compound such as ethylene diamine, diethylene triamine, triethylene tetramine, tetraethylenepentamine, polyethyleneimine or phenylenedianilne, or N,N,N',N'-tetramethyldiaminomethane, N,N,N',N'-tetramethyl-1,2-diaminoethane, N,N,N',N'-tetramethyl-1,3-diaminopropane, N,N,N',N'-tetramethyl-1,6-diaminohexane, N,N,N',N'-tetramethylbenzidine, N,N,N',N'-tetramethyl-4,4'-diaminodiphenylmethane, polyvinyl pyridine or a primary or secondary aminated product from polychloromethylstyrene. Alternatively, if polymer 1 has an alkyl repeating unit with Cl, Br, I or a hydroxyl group, the cross-linking reaction may be carried out by heat treatment or a Friedel-Crafts reaction, and then the remaining substituents are reacted with an amine to introduce anion exchange groups. In another method, substituents are reacted with a polyamine to carry out introduction of anion exchange groups and cross-linking at the same time.

The above approach is considered to be expensive because of the need for halomethylation and multistep process including crosslinking. In addition, high ion exchange capacity would be needed in order to achieve good conductivity, which would cause high dimensional swelling.

In general, known anion exchange membranes are either relatively expensive, as their preparation involves the process of halomethylation, and/or cannot achieve the necessary conductivity and selectivity without substantial dimensional swelling. Membranes which swell also have a tendency for crack formation when drying out in any system.

Fouling of anion exchange membranes is another major difficulty. For efficient electro-processes, the surface of the anion exchange membrane should minimize polarization, water splitting and adsorption of contaminants. Polarization is particularly high in the case of heterogeneous anion exchange membranes.

Attempts have been made to overcome the very high polarization of heterogeneous anion exchange membranes. Examples include the addition of a hydrophilic and conducting surface layer, as described in Kedem et al. (1998), "Low polarisation ED membranes", Desalination, Vol. 118 and Oren et al. (2003) Modified Environmental Engineering Science, Vol. 19(6), pp. 512. Polarization could be reduced by using this modification relative to the high polarization obtained with heterogeneous polyethylene based membranes. However, such coating could not overcome the problem of fouling.

Polarization in electrodialysis processes may also be overcome by using coated spacers in ED unit that separate anion exchange membranes from cation exchange membranes. For example, U.S. Pat. No. 6,090,258 discloses a polymeric netting for use as an ion-conducting spacer in an electrodialysis stack having charged groups incorporated in a polymeric coating applied thereto, imparting to the spacer an average ion exchange capacity of at least 0.25 meq/gr.

Thus, there still remains a need for cost effective anion exchange membranes, possessing a combination of good electrochemical performance and mechanical strength, as well as low degree of dimensional swelling, fouling and polarization.

SUMMARY OF THE INVENTION

The present invention provides anion exchange membranes, methods for producing same and uses thereof. The anion exchange membranes according to embodiments of the present invention achieve a desirable combination of low resistance, high permselectivity and low degree of dimensional swelling. Anion exchange membranes according to embodiments of the present invention are also cost effective.

The anion exchange membranes according to embodiments of the present invention may have applications as films in electro-membrane processes, for example, electrodialysis (ED), variations of ED, such as electrodialysis reversal (EDR), electrodeionization (EDI) and reversed electrodialysis (RED), Donnan dialysis and diffusion dialysis.

The combination of polymeric materials according to embodiments of the present invention may also serve as coating for ion conducting spacers, to be used in electro-membrane processes. The combination of polymeric materials according to embodiments of the present invention may also be used for the preparation of amphoteric membrane coatings. Thus, the present invention further provides coatings for spacers in an electrodialysis unit, and amphoteric films for coating membrane surfaces.

According to embodiments of the present invention, cost effective and efficient anion exchange membranes can be achieved by combining: i) an aromatic polymer comprising alkyl groups that are substituted with halo groups, for example bromomethylated 2,6, dimethyl polyphenylene oxide ($BrCH_2PPO$); and ii) an aminated aromatic condensation polymer wherein the amine groups are directly attached to the aromatic rings, for example, aminated polyphenylsulfone. The term "aromatic condensation polymer" refers to a polymer formed by condensation of reactive groups between the monomer components which in most cases, but not always, is a stepwise polymerization reaction. Examples of polymers formed by this class of polymer reactions include polysulfones, polyethersulfones, polyphenylsulfones, polyetherketones and many others well known in the art.

Part of the halo-alkyl groups of the first polymer are reacted to form crosslinks with part of the amino groups of the second polymer, such that an alkyl bridge is formed between an aromatic ring of the first polymer and an amine of the second polymer. Thus, the two polymers are connected through aryl-alkyl-amino-aryl (Ar—R—NH—Ar) bonds.

The remaining free halo-alkyl groups of the first polymer are further reacted to form permanent cationic groups, for example, quaternary ammoniums. After quatenerization, the resulting films are strong, not brittle and their dimensions in the plane of the membrane change only very slightly upon wetting.

Generally, polymers such as halomethylated 2,6, dimethyl polyphenylene oxide are not considered to be good film forming polymers, but their synthesis is readily carried out, particularly compared to halomethylation processes. Aminated aromatic condensation polymers are generally considered to be good film formers, and they also confer the final membrane good morphology and shape stability. Together, this combination of polymers was surprisingly found to result in shape stable membranes with good conductivity and permselectivity.

The final membrane may include residual free amino groups that may serve in module construction to bring about crosslinking, and may also allow sealing of the membranes together or with other components of a modular electrodialysis unit.

According to one aspect, the present invention provides an anion exchange membrane comprising:
i) a first aromatic polymer comprising cationic groups bound to an aromatic backbone of the first aromatic polymer through alkyl groups; and
ii) a second aromatic polymer comprising aromatic amino groups;
wherein the first aromatic polymer and the second aromatic polymer are crosslinked through an alkyl bridge between an aromatic ring of the aromatic backbone of the first polymer and an amine of the second polymer.

In some embodiments, the alkyl group of the first aromatic polymer comprising cationic groups, the alkyl bridge, or both are a short-chain alkyl containing 1 to 6 methylene groups.

In some embodiments, the alkyl group of the first aromatic polymer comprising cationic groups, the alkyl bridge or both, may be branched or straight. In some embodiments, the alkyl may be substituted or unsubstituted.

In some embodiments, the alkyl group of the first aromatic polymer comprising cationic groups, the alkyl bridge or both are methyl.

In some embodiments, the alkyl group of the first aromatic polymer comprising cationic groups is a short-chain alkyl containing 1 to 6 methylene groups. In some typical embodiments, the alkyl group of the aromatic polymer comprising cationic groups is methyl.

In some embodiments, the cationic groups are quaternary ammonium, phosphonium, sulfonium group or a combination thereof. Each possibility represents a separate embodiment of the invention.

The ion exchange capacity of the cationic groups may range from 0.2 to 5 meq/gr, from 0.6 to 4.0 meq/gr, from 1.0 to 3.5 meq/gr. Each possibility represents a separate embodiment of the invention.

The amine content on the aromatic polymer comprising aromatic amino groups may range between 0.4 to 4 meq/gr, between 0.8 to 3.4 meq/gr. Each possibility represents a separate embodiment of the invention.

In some embodiments, the aromatic polymer comprising cationic groups is based on alkylated polyphenylene oxide, for example methylated polyphenylene oxide. In some typical embodiments, 2,6, dimethyl polyphenylene oxide is used. In general, condensation polymers with aromatic rings in their backbone and methyl or short chain alkyls (typically up to 6 methylene groups) may also be used, for example methylated polyphenylsulfone, or polysulfone based on bisphenol A or polyaromatic ether ketones. Aromatic methylated polystyrenes may also be used.

In some embodiments, the aromatic polymer comprising aromatic amino groups is based on an aromatic condensation polymer. In some typical embodiments, the aromatic condensation polymer is selected from the group consisting of polyphenylsulfones, polysulfones, polyethersulfones, polyetherketones, polyetheretherketones and polyphenylsulfide. Each possibility represents a separate embodiment of the invention.

In some exemplary embodiments, aminated polyphenylsulfone is used as the aromatic polymer comprising aromatic amino groups. In additional exemplary embodiments, aminated polyetheretherketone is used as the aromatic polymer comprising aromatic amino groups.

In some embodiments, the membrane further comprises an aromatic non-derivatized polymer. In some exemplary embodiments, the aromatic non-derivatized polymer is selected from the group consisting of polyphenylsulfone, polysulfone, polyethersulfone, and polyetheretherketone. Each possibility represents a separate embodiment of the invention. In other embodiments, the membrane further comprises an aromatic polymer derivatized with hydrophobic moieties.

The addition of such polymers may provide further strength and shape stability to the final membrane, and may decrease water flow during the electro-dialysis process.

In some embodiments, the additional non-derivatized polymer and/or the aromatic polymer derivatized with hydrophobic moieties constitute up to 50% of the total polymer content of the membrane. In some typical embodiments, the additional inert polymer constitutes from 5% to 30% of the total polymer content of the membrane. Each possibility represents a separate embodiment of the invention.

In other embodiments, the aromatic polymer comprising cationic groups, the aromatic polymer comprising aromatic amino groups, or both, further comprises nitro groups on at least part of the aromatic rings. In additional embodiments, the aromatic polymer comprising cationic groups, the aromatic polymer comprising aromatic amino groups, or both, further comprises halide groups on at least part of the aromatic rings. In some embodiments, the halide group is selected from the group consisting of Fl, Cl or Br. Each possibility represents a separate embodiment of the invention.

The above-mentioned modifications may enhance oxidant stability of the membrane.

In some embodiments, a shape-stable anion exchange membrane is provided, which maintains its lateral dimensions (length and width) in both dry and wet conditions, to within 10%, to within 5%, to within 2% or less. Each possibility represents a separate embodiment of the invention.

As used herein, shape stability, or changes to the dimensions of the membranes are referred to as "swelling". As used herein, "percentage of swelling" refers to such shape changes and not to the water content of the polymers.

In some embodiments, the membrane comprises a single layer. In other embodiments, multiple layers are provided. Multiple layers may include layers of similar composition or of different compositions. In some embodiments, the last surface layer has a higher ion exchange capacity than the underlying layers.

In some embodiments, the anion exchange membrane further comprises a coating layer made of non-charged crosslinked hydrophilic polymers. Crosslinking of the hydrophilic polymers that constitute the coating may be carried our using, for example, a polyepoxy, halo-triazines or diazines, phenol/formaldehyde, multifunctional bromo or iodo alkyl compounds and the like. Such crosslinkers may react with groups such as hydroxyl, phenol or amino, or sulfides on the hydrophilic polymer. In some exemplary embodiments, the coating layer is made of polyvinylalcohol. In some embodiments, the polymeric coating is composed of homopolymers. In other embodiments, the polymeric coating is composed of copolymers. The copolymers may contain anionic groups, e.g. sulfonic groups. Such coating layer may prevent or minimize fouling.

In some embodiments, the anion exchange membrane further comprises a surface coating made of an amphoteric film. Such surface layer may suppress the adsorption of contaminants. In some embodiments the amphoteric coating film comprises a hydrophilic matrix of polymers. In some embodiments, the hydrophilic matrix of polymers comprises polyvinylalcohol, polymers with anionic side groups (such as sulfonic groups), and polymers with cationic groups (such as quaternary ammonium groups).

In some embodiments, the polymers and polymer combinations used for the preparation of the anion exchange membrane of the present invention are used for the preparation of the amphoteric film.

According to these embodiments, the amphoteric layer may be prepared by using an aromatic polymer comprising amino groups that further comprises anionic groups, for example sulfonic groups. In some exemplary embodiments, sulfonated aminated polyphenylsulfone is used. In additional exemplary embodiments, sulfonated aminated polyetheretherketone is used. The aromatic polymer comprising amino groups and anionic groups is mixed with a halomethylated polymer, for example, bromomethylated polyphenylene oxide. The bromomethylated polyphenylene oxide may be aminated to form cationic groups. Alternatively the halogenated alky groups on one polymer may be partly quaternized and crosslinked with excess of aromatic amine. Negatively charged groups may be attached to the unreacted amine. The resulting amphoteric film may be coated onto the anion exchange membrane.

The thickness of the surface coating may range from submicrons to several microns up to 100 microns. In some embodiments, the thickness is less than 10 microns. In some typical embodiments, the thickness ranges from 10 microns to 50 nanometers. Each possibility represents a separate embodiment of the invention. The aforementioned surface coating may be separated from the underlying membrane by a thin hydrophilic neutral layer, such as a thin layer of polyvinyl alcohol.

In some embodiments, the anionic groups of the amphoteric film are sulfonic groups. In some embodiments, the ion exchange capacity (IEC) of the sulfonic groups varies from 0.5 to 2.5 Meq/gr depending on the polymer used. In some embodiments, polyphenylsulfone is used. According to these embodiments, the preferred IEC is from 0.8 to 1.8 Meq/gr. The IEC of the polymer with the cationic groups may be, in one preferred embodiment, equal to that of the sulfoinic groups or anionic groups or it may be within the range of +/−30% of that of the sulfonic or other anionic groups.

Thus, in some embodiments, an amphoteric film for coating a membrane surface is provided, comprising:
  i) a first aromatic polymer comprising cationic groups bound to an aromatic backbone of the first aromatic polymer through alkyl groups; and
  ii) a second aromatic polymer comprising aromatic amino groups and further comprising anionic groups;
    wherein the first aromatic polymer and the second aromatic polymer are crosslinked through an alkyl bridge between an aromatic ring of the aromatic backbone of the first polymer and an amine of the second polymer.

In some embodiments, the anionic group is a sulfonic group. In other embodiments, the anionic group is selected from the group consisting of a carboxylic acid and phosphonic group. Each possibility represents a separate embodiment of the invention.

In some embodiments, the aromatic polymer comprising aromatic amino groups and further comprising anionic groups is sulfonated aminated polyphenylsulfone. In other embodiments, the aromatic polymer comprising aromatic amino groups and further comprising anionic groups is sulfonated aminated polyetheretherketone.

In some embodiments, the polymers and polymer combinations used for the preparation of the membrane are used for the preparation of a coating for a spacer that separates anion exchange components from cation exchange components in an ED unit. Such coating may assist in reduction of polarization and cell resistance in ED processes, which significantly reduces their energy cost. According to these embodiments, a coating for a spacer in an electrodialysis unit is provided, comprising:
  i) a first aromatic polymer comprising cationic groups bound to an aromatic backbone of the first aromatic polymer through alkyl groups; and
  ii) a second aromatic polymer comprising aromatic amino groups
    wherein the first aromatic polymer and the second aromatic polymer are crosslinked through an alkyl bridge between an aromatic ring of the aromatic backbone of the first polymer and an amine of the second polymer.

According to another aspect, the present invention provides a process for the preparation of an anion exchange membrane, the process comprises:
  i) mixing a first aromatic polymer comprising aromatic haloalkyl groups with a second aromatic polymer comprising aromatic amino groups;
  ii) casting the mixture of (i) to form a film and crosslinking at least part of the aromatic haloalkyl groups and at least part of the aromatic amino groups to form an alkyl bridge.

In some embodiments, the ratio of the halo-alkylated aromatic polymer to the amino aromatic polymer ranges from 98/2 to 50/50. In other embodiments, the ratio ranges from 95/5 to 75/25.

1. In some embodiments, the alkyl group is a short-chain alkyl containing 1 to 6 methylene groups. In some embodiments, the alkyl group is methyl.

In some embodiments, the halo group is selected from the group consisting of Br and Cl. Each possibility represents a separate embodiment of the invention.

In some embodiments, the method further comprises converting non-crosslinked aromatic haloalkyl groups to cationic groups.

In some embodiments, the cationic groups are selected from the group consisting of a quaternary amine, phosphonium, sulfonium group and a combination thereof. Each possibility represents a separate embodiment of the invention.

In some embodiments, converting non-crosslinked aromatic haloalkyl groups to cationic groups comprises substituting the halogen with a tertiary amine group thereby forming a cationic quaternary amine.

In some exemplary embodiments, the aromatic polymer comprising aromatic haloalkyl groups is selected from the group consisting of bromomethylated polyphenylene oxide and or chloromethylated polyphenylene oxide. In some typical embodiments, 2,6 dimethyl polyphenylene oxide is used as the base polymer.

In some embodiments, the aromatic polymer comprising aromatic amino groups is based on an aromatic condensation polymer. In some typical embodiments, the aromatic condensation polymer is selected from the group consisting of polyphenylsulfone, polysulfone, polyethersulfone, polyetherketones, polyetheretherketones and polyphenylsulfide. Each possibility represents a separate embodiment of the invention.

In some exemplary embodiments, aminated polyphenylsulfone is used as the aromatic polymer comprising aromatic amino groups. In additional exemplary embodiments, aminated polyetheretherketones is used as the aromatic polymer comprising aromatic amino groups.

It is to be understood that the aromatic polymer comprising haloalkyl groups and the aromatic polymer comprising aromatic amino groups are mixed under conditions where the amino groups do not react rapidly with the halomalkyl groups to the extent that brings the solution to the gel point.

In some embodiments, the aromatic polymer comprising haloalkyl groups is mixed with a tertiary amine in a relatively small amount so as to partially quaternize some of the halo alkyl groups prior to mixing with an aromatic polymer comprising aromatic amino groups. Typically, the tertiary amine constitutes 1-40% of the mixture. In some embodiments, the tertiary amine constitutes 5-20% of the mixture. This step partially quaternizes the haloalkylated aromatic polymer and may improve its solubility. Improved solubility of the haloalkylated aromatic polymer may assist in forming a homogenous mixture with the amino aromatic polymer.

In some embodiments, the reagent that reacts with the haloalkyl groups is a tertiary amine. In some embodiments, the tertiary amine is trimethylamine. In other embodiments, the reacting agent is triethylamine. In additional embodiments, the reacting agent is an alkyl amine with higher alkyl chains, for example, up to 6 methylenes. In yet additional embodiments, the reacting agent is an alkyl amine containing a mix of different alkyls, such as methyl and ethyl groups. In some embodiments, for membranes requiring base stability, the quaternary ammonium groups may be made from DABCO (1,4-diazobicyclo-[2,2,2]-octane), 1,3-bis (dimethylamino-2,2-dimethylpropane). According to the above embodiments, the permanent cationic groups are quaternary ammoniums. In some embodiments, the tertiary amine is hydrophilic as it carries other groups such as hydroxyl groups. For example, the tertiary amine may be triethanolamine.

Thus, in some embodiments, quaternization is performed using a tertiary amine selected from the group consisting of triethylamine, trimethylamine, triethanolamine and DABCO. Each possibility represents a separate embodiment of the invention.

In some embodiments, the membrane is a self-standing film. In other embodiments, the membrane is cast on a support and/or within a reinforcing material or substrate.

The concentration of amino groups on the amino aromatic polymer is determined such that after casting only a relative small number of the present haloalkyl groups on the first polymer are crosslinked with the amino groups of the second polymer, thus leaving a sufficient amount of remaining haloalkyl groups to form permanent cationic groups.

These and further aspects and features of the present invention will become apparent from the figures, detailed description, examples and claims which follow.

BRIEF DESCRIPTION OF FIGURES

Examples illustrative of embodiments of the invention are described below with reference to figures attached hereto. Dimensions of components and features shown in the figures are generally chosen for convenience and clarity of presentation and are not necessarily shown to scale. The figures are listed below.

DETAILED DESCRIPTION OF THE INVENTION

Figure 1:
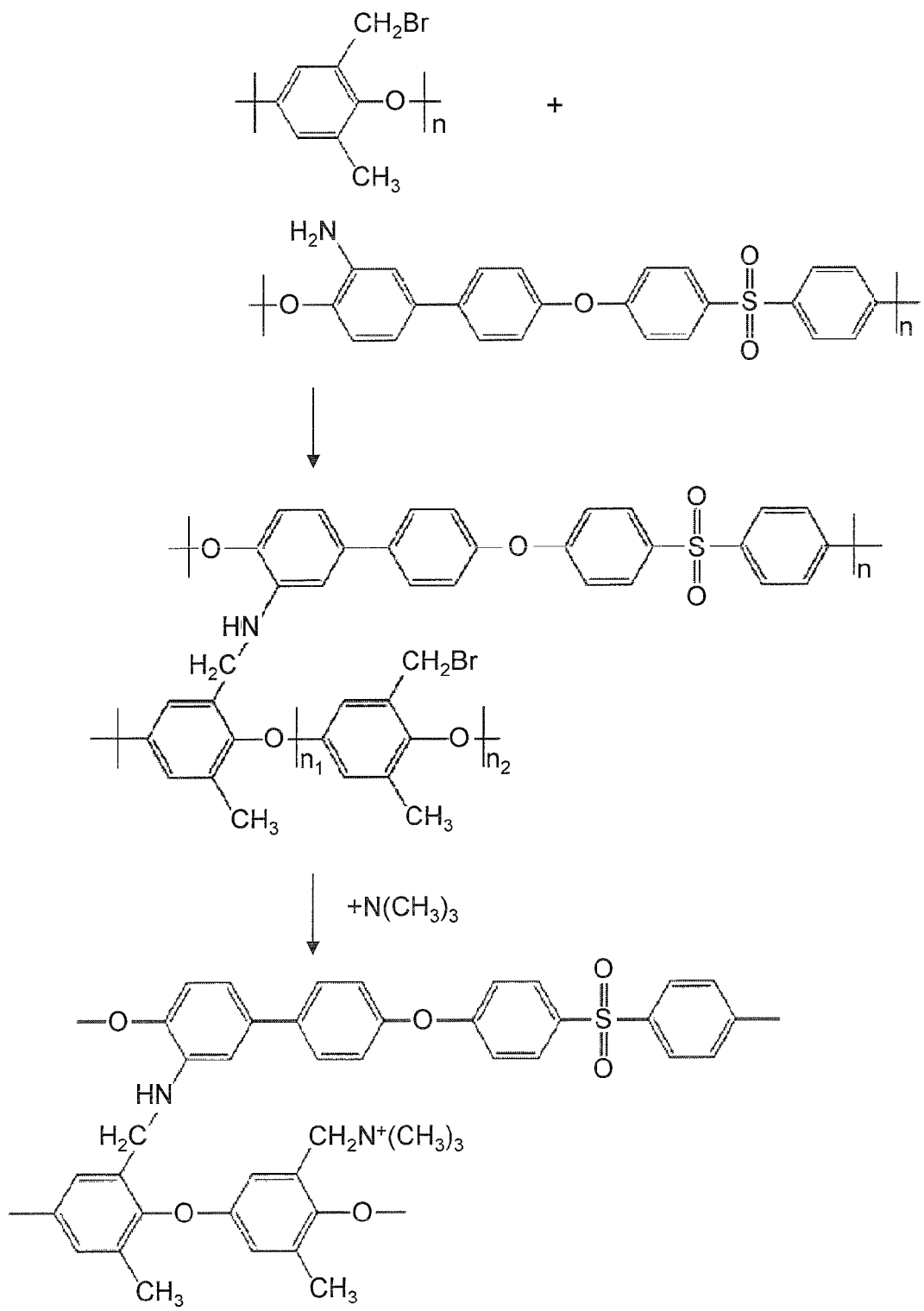
FIG. 1 shows a schematic representation of an exemplary procedure for forming a membrane according to embodiments of the present invention.

The present invention relates to anion exchange membranes with a unique combination of properties such as low resistance, high permselectivity and low dimensional swelling. The membranes according to embodiments of the present invention are optionally sealable to other plastics and/or membranes. The present invention further relates to coatings for ion conducting spacers and amphoteric membrane coatings.

DEFINITIONS

The term "membrane" as referred to herein may relate to a selective barrier that allows specific entities (such as molecules and/or ions, liquids and/or gases) to pass through, while retaining the passage of others. The ability of a membrane to differentiate among entities (based on, for example, their size and/or charge and/or other characteristics) may be referred to as "selectivity".

The term "permselectivity" as referred to herein may relate to the ability to restrict permeation of certain molecules/ions across a membrane on the basis of physical properties. Particularly, the term relates to the preferential permeation of certain ionic species through ion-exchange membranes with the retention of other ions of opposite charge. The transport number of the preferred ion is the fraction of the electric current carried by this ion.

The term "ionselectivity" refers to distinction between ions of charge with the same sign but possibly different valency.

The term "ion exchange capacity" as referred to herein may relate to the number of ionic sites that can participate in the exchange process. The exchange capacity is expressed as milliequivalents per gram (meq/gr).

The term "resistance" as referred to herein may relate to the electrical resistance of a membrane and is expressed as electrical resistance (ohms) of unit area ($\Omega cm^2$). The electrical resistance per unit length, area, or volume of a substance is known as "resistivity".

The term "film" as referred to herein, according to some embodiments, may relate to a self standing selective barrier (for example a selective barrier not supported by a support layer) or a coating layer deposited on/placed on or connected to a support layer and/or membrane or a film with a net or other porous supporting structure embedded within the film.

The term "polymer" may refer to a substance composed of molecules with large molecular mass composed of repeating structural units, or monomers, connected by covalent chemical bonds.

A "copolymer" may refer to a polymer derived from two (or more) monomer species, as opposed to a homopolymer where only one monomer is used.

The term "ionomer" may refer to polymers and/or copolymers containing both ionic and hydrophobic groups.

The term "crosslinking" or "crosslink" may refer to the formation of covalent bonds linking one polymer and/or oligomer chain to another. Crosslinking may also be brought about by interactions other than covalent bonds such as electrostatic or hydrophobic interactions. Unless otherwise stated, crosslinking refers to covalent bonds.

The term "aryl" (Ar) may refer to a group, a functional group and/or a substituent (such as phenyl, benzyl, naphthal, and the like) derived from an aromatic ring, such as benzene ($C_6H_6$). An aryl may be un-substituted or substituted with any substituent, such as an alkyl, alkoxy, amine or any other group.

The term "alkyl" (generally abbreviated with the symbol R) may refer to a functional group or side-chain that consists solely of non aromatic single-bonded carbon and hydrogen atoms.

According to one aspect, an anion exchange membrane is provided, comprising: (i) a first aromatic polymer comprising cationic groups (for example, quaternary ammoniums) bound to at least part of the aromatic rings of the polymer through alkyl groups (for example, methyl); and (ii) a second aromatic polymer comprising aromatic amino groups, wherein the two polymers are crosslinked via an alkyl bridge (for example, methyl group) between an aromatic ring of the first polymer and an amine of the second polymer.

In some embodiments, an anion exchange membrane is provided, comprising:
 i) a first aromatic polymer comprising —($CH_2$)nX groups on at least part of its aromatic rings, wherein n is an integer from 1 to 6, and X is a cationic group; and
 ii) a second aromatic polymer comprising aromatic amino groups;
wherein the first aromatic polymer and the second aromatic polymer are crosslinked through aryl-alkyl-amino-aryl (Ar—R—NH—Ar) bonds.

In some embodiments, the first aromatic polymer comprises —($CH_2$)$_n$X groups on at least some of its aromatic rings, wherein n is an integer from 1 to 6, and X is a cationic group.

Haloalkylated polymers form the first component of the membranes according to embodiments of the present invention. These polymers are crosslinked with aminated aromatic condensation polymers, including but not limited to, aminated polyphenylsulfone, which also give good morphology and shape stability to the final membrane. In these polymers, the crosslinking amino groups are directly attached to the aromatic rings. Additional examples of such good film forming aromatic polymer crosslinkers include, but are not limited to, aminated polyphenylsulfone and aminated polyetheretherketones.

For example, aromatic polymers with methyl groups on at least part of the aromatic rings, such as 2,6, dimethyl polyphenylene oxide (PPO), can be used, and halo groups, for example bromo groups, can be introduced into the methyl function to form bromomethylated groups. Such synthesis is readily carried out compared to halomethylation. Such halomethylated 2,6, dimethyl PPO usually cannot form mechanically stable membranes. Thus, according to embodiments of the present invention, this polymer is mixed with a good film forming aromatic polymer crosslinker, where the crosslinking amino group is directly attached to the aromatic ring, for example, aminated polyphenylsulfone. The aromatic amino groups may also slow the kinetics of the interaction with the bromomethylated 2,6, dimethyl-PPO and allow good casting solutions to be formed to give uniform membranes.

In general, aromatic condensation polymers with methyl or short chain alkyls (typically up to 6 methylene groups) may be used as the first polymer. For example, methylated polyphenylene oxide, methylated polyphenylsulfone, or polysulfone based on bisphenol A or polyethersulfone or polyaromatic ether ketones may be used. Each possibility represents a separate embodiment of the invention. Aromatic methylated polystyrenes may also be used.

Thus, the aromatic polymer comprising cationic groups may be based on a polymer selected from the group consisting of alkylated polyphenylene oxide, alkylated polyphenylsulfone, polysulfone based on bisphenol A, alkylated polyethersulfone, alkylated polyaromatic ether ketone and aromatic alkylated polystyrene. Each possibility represents a separate embodiment of the invention.

The aromatic polymer comprising aromatic amino groups may be based on an aromatic condensation polymer. In some typical embodiments, the aromatic condensation polymer is selected from the group consisting of polyphenylsulfones, polysulfones, polyethersulfones, polyetherketones, polyetheretherketones and polyphenylsulfide. Each possibility represents a separate embodiment of the invention.

In some exemplary embodiments, aminated polyphenylsulfone is used as the aromatic polymer comprising aromatic amino groups. In additional exemplary embodiments, aminated polyetheretherketone is used as the aromatic polymer comprising aromatic amino groups.

The membranes according to embodiments of the present invention show low dimensional swelling. It was found that the membranes show anisotropic swelling, favoring the thickness dimension compared to the length and width dimensions. This anisotropy of swelling is advantageous, in that it allows water uptake to give good conductivity without causing folding or warping in the plane of the membrane. This is very important in ED stacks in general, and especially were the membranes are sealed to each other as described, for example, in WO 2009/077992, to the Applicants of the present invention. As noted above, percentage of swelling as used herein refers to lateral shape changes and not to the water content of the polymer or polymer mixture.

Low swelling membranes are also advantageous as they show reduced crack formation when drying out in any system.

The alkyl groups are typically selected from short-chain alkyls containing 1-6 methylene ($CH_2$) groups. In some embodiments, the alkyl group is methyl.

The cationic groups may be selected from quaternary ammonium, phosphonium, sulfonium group or a combination thereof. Each possibility represents a separate embodiment of the invention.

In some embodiments, aromatic non-derivatized polymers, including but not limited to, non-derivatized polyphenylsulfone, polysulfone, polyethersulfone and polyetheretherketone, and/or aromatic polymers derivatized with hydrophobic moieties, are added to the casting solution. The addition of such polymers may provide further strength and shape stability to the membrane or film and may decrease water flow during the electro-dialysis process. The additional polymer(s) may constitute up to 50% of the total polymer content of the membrane. In some typical embodiments, an additional inert polymer constitutes from 5% to 30% of the total polymer content of the membrane. Each possibility represents a separate embodiment of the invention. The amount of the different polymer components that comprise the final membrane or film is readily optimized and determined by experiments to achieve a process efficient conductivity and permselectivity but with the aforementioned benefits. For example, the desired ion exchange capacity may be achieved by increasing the density of charged groups on the halomethylated polymer to overcome the dilution effect when uncharged polymer is added.

The reactivity of amino groups on the final anion exchange membrane may optionally serve in module construction to bring about crosslinking and also may allow sealing membranes together or with other components of the modular unit.

The electric conductance and permselectivity of the anion exchange membranes according to embodiments of the present invention are high. Such membranes may be cast on a support but also may be used unsupported.

In some typical embodiments, the anion exchange membranes disclosed herein comprises quaternary ammonium methylated polyphenylene oxide (PPO) polymers that have been crosslinked by a polymeric crosslinker. The use of aminated engineering plastics, wherein the amine groups are directly on the aromatic groups, confers the final membrane enhanced mechanical strength and low swelling, and allows for the preparation of thin membranes with good conductivity.

Engineering plastics are known to those skilled in the art. The term refers to a class of polymers based on aromatic backbones, having high strength, stiffness, and toughness, together with high thermal and oxidative stability, low creep, and the ability to be processed by standard techniques for thermoplastics. Non-limiting examples include polysulfones, polyphenylsulfones and other polymers with aromatic and sulfone groups in their backbone, as well as polyphenylene oxides, polyacetal, polyamide, and polycarbonate resins.

The membranes according to embodiments of the present invention also have good chemical stability. Oxidant stability may be further enhanced by using aromatic polymers as detailed above, that further comprises nitro groups and/or halogens, for example Fl, Cl and Br, on at least some of the aromatic rings of the polymer backbone. During the process of halogenation of aryl methyl groups, halogenation, such as bromination, occurs on the methyl but in addition halogenation may also occur on the aromatic ring (see for example U.S. Pat. Nos. 5,028,337 and 5,151,182), which is desirable for increasing oxidant stability. Direct halogenation on the aromatic ring may also be used to increase stability (see for example, U.S. Pat. No. 7,550,216). Similarly, the aminated aromatic polymers used for crosslinking may also contain nitro groups and/or halogens (for example Fl, Cl or Br) directly on some or all of the aromatic backbone of the polymer chain.

The important characteristic of ion exchange membranes with low swelling combined with good conductivity and permselectivity allows the fabrication of ED and DD modular units as described, for example, in WO 2009/077992.

In some embodiments the AEM may be coated with a non-charged crosslinked hydrophilic layer, such as polymers containing polyvinylalcohol. The polymer coating may be composed of homo polymers or copolymers, where the copolymers may contain anionic groups such as sulfonic groups. The coating may prevent or minimize fouling.

The anion exchange membrane according to embodiments of the present invention may have a thin surface coating which is a thin amphoteric film. Such coating layer may significantly improve the properties of the final membrane.

In some embodiments the amphoteric coating film may comprise a hydrophilic matrix of polymers, such as polyvinylalcohol, containing as additives polymers with anionic side groups such as sulfonic groups, and polymers with cationiv groups such as quaternary ammonium groups. The anionic and cationic polymers may be chosen for those described below for other embodiments.

In other embodiments the amphoteric layer may be prepared by attaching anionic groups, for example, sulfonic groups, to the polymer comprising the amino groups which is used for crosslinking. For example, polyphenylsulfone, polyetheretherketone or other polycondensation polymers with aromatic moieties in their backbone chain, may be derivatized to have both amino and sulfonic groups. This polymer may be added to the bromomethylated polyphenylene oxide (PPOBr) solution. A dilute solution is used as a surface coating. The reaction between the polymer carrying both sulfonic and amino groups and the bromomethyleated PPO, followed by subsequent aminatination result in a crosslinked polymer carrying both positive and negative charges.

Thus, according to another aspect, the present invention provides an amphoteric film for coating a membrane surface, the film comprising:
 i) a first aromatic polymer comprising cationic groups bound to the aromatic backbone through alkyl groups; and
 ii) a second aromatic polymer comprising aromatic amino groups and further comprising anionic groups;
 wherein the first aromatic polymer and the second aromatic polymer are crosslinked through an alkyl bridge between an aromatic ring of the first polymer and an amine of the second polymer.

Such surface layer may suppress the adsorption of contaminants. Natural feed water, especially surface water, often contains negatively charged colloids. Neutralization of the negative groups such as carboxyl groups, leaves hydrophobic moieties. A hydrophilic neutral surface is much less adsorbant. The composition of the thin surface layer can readily be adjusted to give an amphoteric, neutral, positively or negatively charged surface, allowing optimization of membranes to given feed solution.

In some embodiments, the anionic groups of the amphoteric film are sulfonic groups. In some embodiments, the ion exchange capacity (IEC) of the sulfonic groups varies from 0.5 to 2.5 Meq/gr depending on the polymer used. In some embodiments, polyphenylsulfone is used. According to these embodiments, the preferred IEC is from 0.8 to 1.8 Meq/gr. The IEC of the polymer with the cationic groups may be, in one preferred embodiment, equal to that of the sulfoinic groups or anionic groups or it may be within the range of +/−30% of that of the sulfonic or other anionic groups.

In other embodiments, the anionic group is selected from the group consisting of a carboxylic acid and phosphonic group. Each possibility represents a separate embodiment of the invention.

In some embodiments, the aromatic polymer comprising aromatic amino groups and further comprising anionic groups is sulfonated aminated polyphenylsulfone. In other embodiments, the aromatic polymer comprising aromatic amino groups and further comprising anionic groups is sulfonated aminated polyetheretherketone.

In some typical embodiments, the material combination for making the amphoteric coatings is bromomethylated 2,6-dimethylpolyphenylene oxide and sulfonated and aminated polyphenylsulfone (SPPSUNH$_2$). An exemplary procedure for producing an amphoteric thin surface layer according to embodiments of the present invention comprises the following steps:
 1. PPOBr is partially quarternized with triethylamine (TEA) or trimethylamine (TMA) to improve its solubility and to make sure it mixes to give a homogenous mixture with the SPPSUNH$_2$. PPOBr may be partially quaternized with X, and 2X and ½X moles of TEA or TMA. The solution is then added to a solution of SPPSUNH$_2$ polymers. Different degrees of quaternization of the PPOBr will give different degrees of homogeneity with the SPPSUNH$_2$ polymer, because of the differences in solubility parameters and polymer-polymer phase separation between the PPOBr and the SPPSUNH$_2$ polymers.
 2. The solution of PPOBr partially reacted with TEA or TMA and SPPSUNH$_2$ is then cast to form a film.
 3. The film is coated onto an anion exchange membrane, and the solvents evaporated (using the same conditions as used to make the anion exchange membrane). The films are immersed in aqueous solutions of TMA under basic conditions until all the remaining Br groups have been reacted.

Other tertiary amino groups such as tri-ethanol-amine may be used instead of TEA and TMA, wherein the choice may be determined by experimentation.

Both the cationic and anionic polymers for the amphoteric coatings may be made with a whole range of engineering plastics as described below for the other components of the anion exchange membrane. The chemistries for introducing both the anionic and cationic groups are well known in the art. The aforementioned surface coatings may also be separated form the underlying membrane by a thin hydrophilic neutral layer such as a thin layer of polyvinyl alcohol.

Another embodiment to forming amphoteric coating layers is to use polyethyleneimine (PEI), preferably in an aqueous solution, to coat the AEM. The PEI coating may then be crosslinked by well known methods, such as the use of halogenated triazines, diazines, epoxy, glutaraldehyde and many other well known methods some of which are described in U.S. Pat. Nos. 4,477,634, 4,584,103, 4,604, 204. Alternatively, the cross linkers may be added to the solution of PEI and coated together. Upon drying, a crosslinked system can be achieved. The membrane coated with PEI may then be ractered with reagents that contain groups that may react with the PEI, such as halogenated tiazines and anionic charge functional groups such as sulfonic groups. Such a combination and others are found in the aforementioned U.S. Pat. Nos. 4,477,634, 4,584,103, 4,604, 204.

In still another embodiment, the amphoteric layer may be formed on the AEM by coating the AEM with a PEI polymer which has been reacted with reagents that contain sulfonic groups. After coating the film may be crosslinked by the aforementioned methods. Such amphoteric polymer is described, for example, in U.S. Pat. No. 6,086,764. PEI amine may be in a range of molecular weights, for example from 2000 to 600,000, with a preferred molecular weights in the range of 20,000 to 200,000.

The thickness of the surface coating may range from submicrons to several microns up to 100 microns. In some embodiments, the thickness is less than 10 microns. In some typical embodiments, the thickness ranges from 10 microns to 50 nanometers. Each possibility represents a separate embodiment of the invention.

The amphoteric crosslinked polymer may also serve as coating for the preparation of an ion conducting spacer.

The polymers and polymer combinations used for the preparation of the anion exchange membranes of the present invention may be used for the preparation of a coating for a spacer that separates anion exchange membranes from cation exchange membranes in an ED unit. If the polymers and crosslinking method according to embodiments of the present invention are used as coatings for a spacer in an ED unit, polarization and cell resistance in ED may be reduced, as described, for example, in U.S. Pat. No. 6,090,258, which may significantly reduce the energy cost of the ED process or increase the rate of desalination at constant energy consumption.

Thus, according to another aspect, the present invention provides a coating for a spacer in an electrodialysis unit, the coating comprising:

i) a first aromatic polymer comprising cationic groups bound to the aromatic backbone through alkyl groups; and
   ii) a second aromatic polymer comprising aromatic amino groups wherein the first aromatic polymer and the second aromatic polymer are crosslinked through an alkyl bridge between an aromatic ring of the first polymer and an amine of the second polymer.

According to another aspect, a method for the preparation of an anion exchange membrane is provided, comprising:

1) mixing an aromatic polymer comprising haloalkyl groups on at least part of its aromatic rings (for example, bromomethylated polyphenylene oxide) with an aromatic polymer comprising aromatic amino groups. The polymers are typically mixed in a common solvent under conditions where the amino groups do not react rapidly with the halomethyl group of the first polymer to the extend that brings the solution to the gel point;

2) casting this solution to form a self standing film or casting/coating on a fabric, net or porous support and evaporating the solvent, and drying the film at elevated temperatures which enhances crosslinking reactions between some of the halo alkyl groups and some of the aminated groups;

3) placing the dried film or membrane into an aqueous solvent containing reagents to react the haloalkyl groups to form permanent cationic groups (for example, quaternary ammoniums). This step may be optionally followed by another drying step at elevated temperature.

Optionally, the aromatic polymer comprising haloalkyl groups is mixed with a reagent that reacts with the haloalkyl groups, such as a tertiary amine, prior to mixing with the aromatic polymer comprising aromatic amino groups. This step partially quaternizes the haloalkylated aromatic polymer and This sequence procedure may be performed on a solid support from which the film is removed. Alternatively, the procedure may be done on a support such as a fabric or cast onto a net, or a porous film.

This sequence of steps may be repeated onto the first film (supported or not) to form multiple layers of similar composition or of different compositions. The layers may therefore have the same or different composition. In some embodiments, the last surface layer has a higher ion exchange capacity than the underlying layers, and hence high conductance. Such arrangement may facilitate the entrance of ions into the membrane at any point on the surface of the membrane and reduce polarization.

In some embodiments, the last layer is a surface coating that contains both anion and cation groups to minimize fouling. The composition of the surface layer may readily be adjusted to give a neutral, positively or negatively or amphoteric charged surface, allowing optimization of membranes to given feed solution.

The concentration of amino groups on the crosslinking polymer is determined so that after casting only a relative small number of the present halomethyl groups on the first polymer are reacted to bring about crosslinking, while leaving a sufficient amount of remaining haloalkyl groups to form permanent cationic groups, such as quaternary ammonium groups.

In some embodiments, during the evaporation step, some of the amino groups react with the haloalkyl to form crosslinks. In the next step, where the film is immersed in a solution comprising a reagent that reacts with the haloalkyl groups, e.g. a tertiary amine, the pH and conditions are such that additional crosslinking reactions occur between some of the remaining amino groups and halomethyl groups. This step may also be followed by a drying step at room temperature or elevated temperature to complete the reactions.

In some typical embodiments, the reagent that reacts with the haloalkyl groups is a tertiary amine. In some embodiments, the tertiary amine is an alkyl amine. For example, trimethylamine or triethylamine may be used. In other embodiments, the tertiary amine has at least one aromatic moiety.

In some embodiments, the anion exchange membranes are made by combining an aromatic polymer with benzyl halide groups with a polyamine crosslinker. Examples of aromatic polymer with benzyl halide groups include haloalkylated poly-aromatic engineering plastics, such as chloro or bromomethylated poly aromatic engineering plastics. For example, 2,6, dimethyl polyphenylene oxide may be used. Chloro or bromo methylated aryl polyarylsulfones or polyetherketones may also be used. The use of halomethylated aryl polymers such as polyarylsulfones is less preferred than the use of halomethylated 2,6 dimethyl polyphenylene oxide as the cost of synthesis of halomethylation in these polymers is higher than for the former.

Examples of the polyamine crosslinker include aminated aromatic engineering plastics, such as aminated polyphenylsulfone or other engineering aromatic condensation plastics such as (but not limited to) polythersulfones, polysulfones and polyetheretherketones or polyether ketones where the amino group is directly attached to the aromatic.

The advantage of using a polymer with aromatic amino groups and not an alkyl amine is the improved chemical stability and mechanical strength of the former and the lower rates of interaction in solutions when the amine polymer is mixed with the halomethylated polymers. This simplifies the membrane forming procedure and gives stable low swelling membranes.

In some embodiments, tertiary amines are present in the casting solution and react with some of the halomethylated groups on, for example, the bromomethylated 2,6 dimethyl polyphenylene oxide (PPO). The partial derivitation of the polymers may improve solution properties of the halomethylated polymers in the casting solution and may form better membranes. The quantity of the tertiary amines can readily be determined by a series of experiments and observation on the clarity and homogeneity of the final membrane.

Variations may be introduced to the above sequence of steps for forming a membrane according to embodiments of the present invention. For example, the prepared cationic polymer with un-reacted halomethyl groups may be mixed to form a solution in a common solvent with the amino aromatic polymers (for example, amino polyphenylsulfone) and this solution may be cast to form a self standing or supported or re-enforced film/membrane.

In some embodiments, shape-stable anion exchange membranes are provided, which maintain their lateral dimensions in both dry and wet conditions to within 15%, to within 10%, to within 5%, to within or less than 2%. Each possibility represents a separate embodiment of the invention.

Change of dimensions may be further minimized by limiting swelling of the polymer material due to one or more of the following properties: 1) hydrophobic parts of the ionomer polymer, 2) increased crosslinking and/or 3) by a dimensionally stable membrane support upon which or into which the membrane is cast and fabricated, and or the addition of non-ionic and relatively hydrophobic polymers such, for example, polysulfones, polyphenylsulfones, or polyethersulfones or polyetherketones. Such non-ionic and relatively hydrophobic polymers should be added in small quantities so as not to increase the electrical resistance to unacceptable levels.

As described above a cationic polymer (in effect an anion exchange polymer used to form anion exchange membranes) may be crosslinked wherein the cationic polymer is derived from, for example, poly-functional halomethylated aromatics, oligomers or polymers, such as preferably bromo or chloro methylated polyphenylene oxides and less preferred the fluoro or iodo derivatives. Examples of such polymers include 2,6 dimethyl polyphenylene oxide. Less preferred polymers include bromomethylated polysulfone or bromomethylated polyphenylsulfone or chloromethylated polystyrene formed by halomethylation reactions, where crosslinking is brought about by the reaction of a minor portion of these halomethylated groups by functional poly-aromatics with amino groups directly on the aromatic moieties, including but not limited to, aminated polyphenylene oxides or aminated polysulfone or aminated polyphenylsulfone or aminated polyethersulfones or aminated poyetheretherketone or aminated polystyrene. It is to be understood that bromomethylated and chloromethylated polymers are interchangeable, with the bromo group being relatively more reactive than the chloro group. The choice of polymer may also be governed by the ease of synthesis and the relative reactivity within the membrane forming solutions. Low reactivity within the casting solution may be preferred to simplify the conditions of fabricating the membranes.

In some embodiments, the aromatic polymers comprising amino groups attached directly to the aromatic ring are engineering plastic, for example polysulfone, polyethersulfone, polyphenylsulfone, polyetheretherketone, polyetherketoneetherketone, and many more as will be listed below.

The cationic polymers according to embodiment of the present invention are polymers known as ionomers, which are macromolecules in which a minor but significant proportion of the constitutional units have ionizable or ionic groups, (positive for the cationic polymers of this invention) or both, with an uncharged hydrophobic polymer component. Combination of such polymers with ionomer cross-linking polymers according to embodiments of the present invention, results in a membrane characterized by low degree of swelling, at least in the width and length dimensions of the membrane or film, with good conductance.

Swelling may also be decreased by adding small quantities of an inert polymer fraction in the mixture, that may be chosen from engineering plastics such as polysulfone, polyethersulfone, polyphenylsulfone, polyetheretherketone. Due to the excellent mechanical properties of these polymers, it may be possible to prepare unsupported membranes and keep membrane resistance low enough by decreasing the thickness of the membrane. The actual quantities of the additional inert polymer are readily determined by a person skilled in the art.

As described above, the preferred halomethylated derivative is derived from engineering plastic containing methyl groups on an aromatic backbone. In some typical embodiments, the polymer is the commercially available 2,6 dimethyl polyphenylene oxide. Other aromatic polymers, such as polysulfones, polyphenylsulfones, polyether sulfones or polyetherketones with aromatic methyl groups or less preferred ethyl or propyl groups on the aromatic backbone may also be used.

The polymer forming the anionic exchange polymers, the polymer forming the aminated derivatives (in effect, the aromatic amino polymers) and the hydrophobic polymer matrix, may be chosen from the following polymers: polymers made from condensation polymerization, such as polysulfone, polyether sulfone, polyphenylsulfone, polyphenylene sulfone, poly-ether-ketone, polyether-ether-ketone, polyether ketone-ether-ketone, polyphenylene sulfide, polyphenylene sulfone and variations of sulfide and sulfone in the same polymer and other variations of polyether ketones and poly-sulfone. Thus, some of the categories of the preferred ionic polymers may be derived from a polysulfone (PSU), polyphenylene oxide (PPO), polyphenylene sulfoxide (PPSO), polyphenylene sulfide (PPS), polyphenylene sulfide sulfone (PPS/$SO_2$), poly-para-phenylene (PPP), poly-phenyl-quinoxaline (PPQ), poly-aryl-ketone (PK) and polyether-ketone (PEK) polymer, polyethersulfone (PES), polyether-ether-sulfone (PEES), polyarylethersulfone (PAS), polyphenylsulfone (PPSU) and poly-phenylene-sulfone (PPSO2) polymer; the polyimide (PI) polymer comprises a polyetherimide (PEI) polymer; the polyether-ketone (PEK) polymer comprises at least one of a polyether-ketone (PEK), polyether-ether-ketone (PEEK), polyether-ketone-ketone (PEKK), polyether-ether-ketone-ketone (PEEKK) and polyether-ketone-ether-ketone-ketone (PEKEKK) polymer; and the polyphenylene oxide (PPO) polymer comprises a 2,6-diphenyl PPO or 2,6-dimethyl PPO polymer. Preferred polyether-ketone polymers include polyether-ketone (PEK), polyether-ether-ketone (PEEK), polyether-ketone-ketone (PEKK), polyether-ether-ketone-ketone (PEEKK) and polyether-ketone-ether-ketone-ketone (PEKEKK) polymers.

In some embodiments, halogenated 2,6-dimethyl PPO polymer is used as the aromatic polymer comprising haloalkyl groups. Derivatization of 2,6-dimethyl PPO to form halogenated polymer is relatively simple. The halogen groups are introduced to the methyl groups already on the polymer. If the process of derivitation includes the introduction of the entire halomethyl groups on polymers such as polysulfone, polyether sulfone, poly(p-phenylene sulfone), polystyrenes, polyphenylene oxides, polyphenylene sulfides, polyether ketones (PEK), polyether ether ketones (PEEK) or polyether etherketoneketones (PEEKK), it is less preferred.

In some embodiments, the aminated polymers are based on polymers such as polyaryl ethers, polyaryl thioethers, polysulfones, polyphenylsulfones, polyphenylenesulfone, polyether ketones, polyetheretherketones, polypyrroles, polythiophenes, polyazoles, phenylenes, polyphenylene-vinylenes, polyazulenes, polycarbazoles, polypyrenes, polyindophenines and, especially polyaryl ethers.

Examples of commercial sources of some of these polymers include: Solvay, ICI, and BASF. For example, from Solvay: RADEL™ R polyphenylsulfone, UDEL™ polysulfone, RADEL™ A polyether sulfone and as well as SOLEF™ fluoro-polymer.

In some embodiments, the combination of polymers comprises halomethylated 2,6-dimethyl PPO polymer and aminated RADEL™ R polyphenylsulfone. By itself, quaternary ammonium 2,6-dimethyl PPO polymer dose not have good mechanical stability. However, in combination with a minor amount of aminated RADEL™ R polyphenylsulfone (for example, 5 to 20%), where amino groups have been reacted with some of the halomethylated groups, excellently stable anion exchange membranes may be formed after reaction of the halomethyl groups with tertiary amines to form quaternary ammoniums.

In some embodiments, the uncharged polymer is chosen from aromatic engineering plastics such as polysulfone, polyethersulfone, polyphenylsulfone, polyetheretherketone. The ionomers and aminated polymers may also be formed by modification of these polymers (by well known methods) or by synthesis from their monomer units. The later is exemplified, for example, by U.S Patent Application Publication No. 2006/0036064.

In addition to linear polymers or slightly branched polymers, highly branched polymers may also be used to form the aminated aromatic polymers. In effect, the above condensation polymers may also be made branched and more highly functionalized by the use of monomers with more than two functional groups. See for example, Fritsch D, Vakhtangishvilli L. and Kricheldorf H R (2002) J of Macromolecular science A vol 39 (11): 1335-1347 and in J polymer Science A Vol 40 (17): 2967-2978 "Synthesis and functionalization of polyethersulfones based on 1,1,1 tris (4-hydroxy[rho]henyl)ethane" and U.S. Patent Application Publication No. 2004/0242807.

Another useful category of aromatic polymers for derivitation into aminated polymers are polyphenylene polymers, such as poly(p-phenylene) and poly(p-xylylene). Examples of such polymers are given in U.S. Patent Application Publication No, 2005/0261459. For example, polymers comprising monovalent endcappers, divalent linear units, and polyvalent branching units are disclosed therein. The composition of the polymers may be controlled by adjusting the ratio of the three types of monomers.

Other polyphenylene polymers are disclosed, for example, in U.S. Pat. No. 5,227,457, semi-rigid as disclosed, for example, in U.S. Pat. No. 5,886,130, and may have reactive side groups as disclosed for example in U.S. Pat. No. 5,625,010 or end groups as disclosed for example in U.S. Pat. No. 5,670,564. Polyphenylenes may also have a branched (Kovacic et al, Chem. Rev., 1987, 87, 357-379), or hyperbranched structure (Kim et al., Macromol., 1992, 25, 5561-5572).

The above aromatic backbone polymers used for forming the halogenation on methyl or alkyl aryl groups and those used for halomethylation and for the polymer with amino groups on the aromatic backbone, may all be further partially derivatized to introduce in to some of the aromatic rings halogen groups, such a Fl, Cl or Br, or nitro groups by well established methods. This may be carried out to improve the oxidant stability of the final polymers used to make the anion exchange membranes. Halogens and nitro groups are known as oxidant stabilizers for polymers as they are electron withdrawing groups that reduce the number of sites an oxidant may react with in the polymer. The degree of substitution of the nitro or halogen groups may vary from 0.1 to 3 meq/gr, alternatively between 0.5 to 2.0 meq/gr.

The cationic groups according to embodiment of the present invention may be chosen from quaternary ammonium, phosphonium and sulfonium. As described above, the polymers with these cationic groups may be made from precursor polymers such as halomethylated polyphenylene oxide. Longer chain alkyls, such as ethyl may also be used. Other polymers, such as (but not limited to), haloalkylated derivatives of the aromatic condensation polymer may be used. Examples include polysulfone, polyethersulfone, polyphenylsulfone and PEEK, PEKEK and PEK which are readily converted to quaternary ammonium, phosphonium and sulfonium derivatives.

Quaternary ammonium groups as the anion exchange moiety may be based on alkyl ammoniums such as methyl groups. For membranes requiring base stability, the quaternary ammonium groups can be made from DABCO (1,4-diazobicyclo-[2, 2, 2]-octane), 1,3-bis (dimethylamino-2,2-dimethylpropane) or another diamino, which is alkali-stable, capable of forming quaternary ammonium ions. Such groups as DABCO are known as described, for example, in U.S. Pat. No. 5,660,709. For highly hydrophilic membranes, surface layers or spacers, tri-ethanol-amine may be used.

The ion exchange capacity of the quaternary ammonium cationic groups may vary from 0.2 to 5 meq/gr, between 0.6 to 4.0 meq/gr, between 1.0 to 3.5 meq/gr.

The amine content on the polymers containing amino groups on the aromatic backbone may vary between 0.4 to 4 meq/gr, between 0.8 to 3.4 meq/gr.

In a preferred embodiment of the invention, combinations of the cationic ionomers and aminated polymers and optional non derivatized relatively hydrophobic polymers may be supported on a fabric or other reinforcement structures (e.g., embedded nets) where there is relatively good adherence of the polymers to the support. The membranes according to embodiments of the present invention include self standing films but may also be formed by casting the polymer on, and/or within a reinforcing material or substrate.

Such substrate may be chosen from woven and non-woven synthetic fabrics such as polypropylene cloth, polyacrylonitrile cloth, polyacrylonitrile-co-vinyl chloride cloth, polyvinyl chloride cloth, polyester cloth, and the like. Other suitable substrates include glass filter cloth, polyvinylidene chloride screen, glass paper, treated cellulose battery paper, polystyrene-coated glass fiber mat, polyvinyl chloride battery paper, and the like.

In some embodiments, the membrane is a film reinforced by an embedded net of similar materials described for the cloths, papers and mats. The modifications that may be carried out to modify these supports in order to have adherence between the polymer component(s) of the membrane and the substrate or fabric include, but are not limited to, chemical reactions such as surface oxidation or sulfonation, graft polymerization, coating from solution containing an adhering polymer which may be a homo polymer but is most effectively a block copolymer of a graft polymer with a backbone of one chemical composition and grafted chains of another.

The variables or forming the membranes as described above (but not limited to), may be used together and optimized in combination with the degree of crosslinking, and the presence of non-derivatized relatively hydrophobic polymer to achieve the desired combination of properties such as low resistance, high permselectivity, and low dimensional swelling, and optionally ability to seal to other plastics and or membranes. For example, the variables and parameters that may be optimized include:

1) The use of crosslinking and fabric reinforcement with a matrix polymer which in addition to being crosslinked is also hydrophobic and compatible with the ion exchange material using polymeric surfactants.
2) The use of crosslinking to achieve a tighter membrane, to anchor a thin surface layer to the membrane, and to anchor a thin layer on a support.
3) The use of crosslinking and fabric reinforcement.
4) The use of crosslinking with a hydrophobic matrix polymer.
5) The presence of a non cross-linked polymer to aid heat seal-ability and dimensional stability, and to reduce water transport.
6) The presence of amine groups that may be reacted with reagents such as epoxy resins, to chemically seal the membrane edges to a frame.
7) The use of polymers which are partially halogenated or nitrated to enhance oxidant stability.
8) The use of higher molecular weight polymers rather than lower molecular weight polymers.

Membranes according to embodiments of the present invention may achieve their desirable properties by combining the chosen polymers, the chemistry of crosslinking and the casting fabrication method together with the options of reinforcement on or within a fabric, cloths, mats or nets and the addition of a hydrophobic polymer.

The ion exchange membranes of this invention may include a single layer or multiple layers (such as two or more, three or more layers). Each layer may have the same or different ion exchange capacity, quantity of crosslinking polymers and when used, hydrophobic polymer additives. In some embodiments, each of these parameters may vary between the layers.

A surface layer may be amphoteric or mixed charged in order to minimize fouling. The composition of this surface layer can readily also be neutral, positively or negatively charged surface, allowing optimization of membranes to given feed solution.

Aryl amino derivatives of the engineering plastic according to embodiments of the present invention may be derivatized from nitro or amino containing polymers. Many methods are known in the art. Examples of procedures used for nitration to nitro derivatives and then reduction of the nitro derivatives to amino derivatized polymers are given, for example in W. H. Daly and S. Lee and C. Rungaroonthaikul "Modification of Condensation Polymers" Chapter 1 in Chemical Reactions on Polymers, ACS Symposium Series 363 (1988). If the degree of nitration is relatively high, only partial reduction of the nitro groups may be carried out and the remaining nitro groups may be used to enhance oxidant stability.

Methods for halomethylation of aromatic polymers to form chloro and/or bromo-methyl derivatives are well known in the art. An exemplary method for bromination of 2,6 dimethylpolyphenylene oxide to form a bromomethylated derivative is given in U.S. Pat. Nos. 5,028,337 and 5,151,182. Other methods are also known where carbon tetrachloride solvents can be substituted by other more environmentally friendly solvents such as chlorobenzene. Methods for partial chlorination or bromination on the aromatic ring may also be used to enhance oxidant stability of the final anion exchange polymers.

Applications of the Anion Exchange Membranes

Electrodialysis (ED) is a desalting technology where ions are transferred from feed to brine solutions by passing an electric current through a stack comprising ion exchange membranes. ED removes salts from feed water, and not water from solutes, as performed in filtration processes. Thus, unlike reverse osmosis (RO), it is particularly advantageous for the treatment of brackish water containing relatively low amounts of salt, or small amount of unwanted salts, such as nitrates. In ED, high concentrations of solutes do not require high pressures, and various contaminants may be handled better than RO. Thus, ED can solve a crucial, currently expensive, unsolved problem of brine disposal in the desalting of brackish water. ED can also be useful in treatment of sea water and in RO for treatment of concentrate. To reach its full potential, ED must overcome some current technological problems, such as the high cost of ED stacks and the operational problems involved in repair and maintenance.

WO 2009077992, to the Applicants of the present invention, discloses a unique modular cell design of an ED unit. One important aspect described in this application is shape stable cation exchange membranes which have good selectivity, low resistance and can be adhered to the modular structure. While state of the art cation exchange membranes approach some of the necessary criteria, they do not meet all the criteria. For example, ion exchange membranes with good conductivity do not have sufficient shape stability. Membranes according to embodiments of the present invention may meet all these requirements.

The membranes according to embodiments of the present invention may be used for all versions of ED and customary applications of electro-membranes such as EDR, EDI and RED.

The membranes according to embodiments of the present invention may also be used for Donnan Dialysis, i.e. removal of some anions by ion exchange across the membrane, and for Diffusion Dialysis, in which some component preferentially passes through the membrane. An example for such separation process is to remove solutes from aqueous solutions, while retaining proteins and larger components. The anion exchange membranes according to embodiments of the present invention have good selectivity, high conductivity and shape stability, that can be used to make dialysis modules with high efficiency.

In some embodiments, the combination of polymeric materials of the present invention are used to make coatings for spacers for fabricating ion conducting spacers, that can be placed between ion exchange membrane and significantly reduce membrane polarization and significantly increase process efficiency. (See, for example, U.S. Pat. No. 6,090,258). The coated spacers according to embodiments of the present invention may have improved electric conductance, as well as improved chemical and dimensional stability as compared to those known in the art.

Polarization is a local change of concentration, resulting from ion-transport phenomena, bringing about a high ohmic resistance caused by depletion of salt in the solution in the immediate vicinity of the membranes. Strong polarization causes, "water splitting" with pH changes which promote fouling and cause membrane damage. This effect of polarization may be minimized by coating the spacers between the membranes with the anion exchange coatings according to embodiments of the present invention. For example, a spacer in the form of a net of polypropylene, polyethylene or polyolefin copolymer or mixture thereof may be coated with a solution containing polymer combinations according to embodiments of the present invention to form anion exchange coatings. By using the compositions and methods according to embodiments of the present invention, a stronger and more readily carried out anion exchange spacer coatings may be provided.

The membranes according to embodiments of the present invention may be used to advantage in Reverse Electrodialysis (RED) where difference in the salt concentration of two different feed streams may be used to generate electrical voltage and current.

In some embodiments, membranes according to the present invention give sharp separations between anions of different valency and acids in dialysis systems. Applying nanofiltration, the permeate may be more concentrated than the feed—so-called negative rejection, as has been shown by Hoffer, E. and Kedem, O, Negative rejection of acids and separation of ions by hyperfiltration. Desalination 5, 167 (1968). This effect is strengthened by the presence of impermeable salt due to the Donnan effect (M. Perry and C. Linder, Desalination, 71, 233-245, (1989)). Thus very effective treatment of acid mining liquors is feasible.

Preparation of Polymers

The following description contains specific examples for aminated polyphenylsulfone and for 2,6 dimethyl polyphenylene oxide for illustration purposes only. In the following and in the Examples the abbreviation PPO stands for 2,6 dimethyl polyphenylene oxide and PPSU stands for polyphenylsulfone.

Preparation of Aminated polyphenylsulfone (PPSUNH$_2$):

Nitration of PPSU:

1) 20 g PPSU are dissolved in 200 ml chloroform (CP).
2) A round flask with mechanical stirrer is filled with 160 ml chloroform (CP), and then 4 ml H$_2$SO$_4$ and 4 ml HNO$_3$ 70% are added. The solution is stirred for 30 minutes.
3) The PPSU solution of (1) is poured into the flask.
4) The flask is washed with about 20 ml chloroform that are added to the reaction mixture. The mixture becomes green, then orange, and then turns red. The reaction is continued for 3 h.
5) The mixture is precipitated in methanol, filtered, dried in air, washed with water, washed with methanol and dried.

The percentage of elemental nitrogen (% N) of the final product can be determined by analytical laboratory methods known to a person skilled in the art. The % N may vary, for example, from 3.3 to 3.8%.

Reduction of PPSUNO$_2$:

1) 6 g PPSUNO$_2$ is dissolved into 70 ml dimethylformamide (DMF) analytical.
2) 18 g SnCl$_2$ hydrate, analytical, are added to the solution under nitrogen atmosphere.
3) The solution is stirred overnight, then precipitated with ice, washed with water, washed with HCl solution and again with water to neutralize the pH, 4) The precipitate is washed with methanol and dried in air. It is then dissolved in DMF, precipitated with a cold ammoniac solution, washed with water, washed with methanol and dried first in air and then in a vacuum oven at 50° C.

Purification of 2,6Dimethylpolyphenylene Oxide from Low MW Fractions:

Different methods are well known in the art to separate the high molecular weight fraction from the low molecular weight fraction, and the latter often gives better properties. One example of such a purification method is as follows: 400 gr. of commercial-grade 2,6 dimethyl poly(phenylene oxide) polymer in fine powder form having an intrinsic viscosity of 0.49 dl/g, which are available from Aldrich Company, are refluxed with about two liters of methyl ethyl ketone under mechanical agitation to form a slurry. The slurry is then filtered, while still hot, through a coarse sintered glass filter, thereby recovering a partially purified polymer in solid form. The recovered polymer is washed with about 1 liter of fresh methyl ethyl ketone. The polymer is again refluxed, filtered and washed as indicated above to obtain a further purified polymer. The polymer is washed until the resulting filtrate is clear and colorless. The polymer is dried to a constant weight at about 80° C. in a vacuum oven. The polymer yield is about 78%. The recovered polymer has an intrinsic viscosity of 0.59 dl/g while the combined filtrate (extracted portion) has an intrinsic viscosity of about 0.34 dl/g.

Typical ratios of the halo-methylated polymer to the amino polymers are from 98/2 to 50/50, from 95/5 to 75/25. If other non reactive polymers, such as non-derivatized polymers, e.g. PSU or PES or PEEK, are added, they may be added up to 50% of the total polymer content or in the range of 5 to 30%. Other non-reactive groups may be added to the polymer backbones of the halomethylated and amino polymers such as halides directly attached to the aromatic as Fl, Cl and Br and other groups such as nitro groups. Examples of the methods for introducing such groups into aromatic backbones are well documented in the technical and patent literature. The introduction of such groups may enhance the oxidant stability of the final polymers and thus the invented films and membranes.

Permselectivity of the membranes according to embodiments of the present invention may be determined using the following method:

Membranes are equilibrated at 30° C. in 0.1-1N NaCl solutions prior to characterization. Membrane permselectivity is determined by measuring the membrane potential. An experimental cell which may be used for the membrane potential measurements has two compartments separated by a circular window of 3.14 cm$^2$ area closed with a membrane. In order to minimize the effect of boundary diffusion layers on potential, the solutions in both the compartments are vigorously stirred with magnetic stirrers. Membrane potential measurements are performed using NaCl solutions of different concentrations, for example 0.1-0.2N and 0.5-1N. The potential difference (Em) developed across the membrane is measured using a pair of Ag/AgCl reference electrodes placed on the two sides of the tested membrane.

The transport number of the anion, t, is calculated from the measured potential as follows:

$$t = \tfrac{1}{2} + E_m/(2E_{Ideal})$$

where the ideal potential $E_{ideal}$ is given by $$E_{Ideal} = (RT/nF) * \ln(C_1\gamma_1/C_2\gamma_2)$$

Measurements of membrane resistance may be performed using the following method:

Membranes are equilibrated at 30° C. in 0.1-1N NaCl solutions prior to characterization. Specific conductivity of the membranes is measured in a flow cell with a fixed and well-defined geometry. The cell is consisted of two chambers separated by the studied membrane. Each chamber contains a platinum electrode coated with platinum black. A 0.1N NaCl solution is circulated through each chamber by means of a peristaltic pump. The electrical conductance of the cell was measured by means of a conductivity meter (El-Hamma Instruments, Israel, model TH-2300), with and without the membrane separating the two chambers. The membrane conductivity per cm², $k_m$, is then calculated from the difference in the conductivity of the two measurements using the expression:

$$S/k_m = S(1/k_{cm} - /k_{cs})$$

Where $k_m$ is the conductivity of the membrane, $k_{cm}$ and $k_{cs}$ are the conductivities of the cell per membrane area with and without the membrane respectively ($k_{cm}$—cell with membrane; $k_{cs}$—cell with solution only), and S is the area of the measured membrane. The reciprocal of conductivity is the membrane resistance:

$$R_m = 1/k_m$$

The following examples are presented in order to more fully illustrate certain embodiments of the invention. They should in no way, however, be construed as limiting the broad scope of the invention. One skilled in the art can readily devise many variations and modifications of the principles disclosed herein without departing from the scope of the invention.

EXAMPLES

Example 1

Preparation of Polymer Derivatives

Radel 5900 Polyphenylsulfone (PPSU) was nitrated and reduced to the amino derivative by the procedure described in W. E. Daly, S. Lee and C. Rungaroonthaikul, "Modification of Condensation Polymers" In: Chemical Reactions on Polymers, Chapter 1, pp 4-23, ACS Symposium Series, Volume 364, 1988, and given in detail above, to give a PPSUNH$_2$ polymer derivative with 2.8 meq/gr —NH$_2$ groups.

In addition, 2,6 dimethylpolyphenylene oxide (PPO) was purchased from Aldrich. On the original polymer (PPO) or the high molecular weight fraction of the PPO, bromomethylation of 2,6 dimethyl polyphenylene oxide (after purification) was carried out according to the procedure described in U.S. Pat. No. 4,468,501. For example, to form a Br capacity (determined by NMR) of 2.98 meq/gr, 12.5 gr of PPO (0.104 moles) and 4 ml (0.075 mole) of bromine were used. The PPO was dissolved in 160 ml of chlorobenzene (pure Carlo Erba) and then refluxed. Under reflux the bromine was slowly added over a 2 hr period, and after all the bromine was added, heating was continued for another 30 minutes. To make a Br capacity (determined by NMR) of 3.7 meq/gr, 25 gr of PPO (0.208 mole), 8 ml (0.15 mole) bromine and 320 ml of chlorobenzene were used. Bromination may also be carried out using the procedure described in U.S. Pat. No. 5,028,337 with carbon tetrachloride instead of chlorobenzene. By adjusting the conditions of the Br concentration and time of reaction, a range of different bromomethylated concentrations could be achieved from less than 1 to more than 4 meq/gr.

The same bromination reactions were carried out on the 2,6 dimethyl polyphenylene oxide samples without separation of the low molecular weight fraction from the higher molecular weight fractions and gave bromomethylated polymers whose degree of bromination could be adjusted as described above. These bromomethylated 2,6 dimethyl polyphenylene oxide could also be used to form films and membranes as described below with good results.

Example 2

Preparation of Anion Exchange Membranes as Self Supporting Films

To prepare anionic exchange films from the polymers of Example 1, solutions 1 and 2 below were prepared. Both solution 1 and 2 were stirred for 3 hr and then solution 2 was added to solution 1 and the mixture stirred for an additional 1 h. The solution was then cast to a wet film thickness of 200 microns and dried in the oven at 85° C. A schematic representation of a procedure for forming a membrane as described herein, using the polymers of Examples 1 is shown in FIG. 1.

Solution 1:

| | |
|---|---|
| PPOBr (V 101 or V 137) | 1.24 g. |
| Tetrahydrofuran (THF) (analytical) | 10 ml. |
| CH$_3$OH (CP or technical) | 1.5 ml |
| Triethylamine (analytical) | 0.4 ml |

Solution 2:

| | |
|---|---|
| PPSUNH$_2$ (% N > 3) | 140 mg. |
| DMF (analytical) | 6 ml |

The dried film was then immersed into an aqueous saturated solution of triethylamine for 2 days, and then washed with water. To determine IEC, the film was immersed into NaOH (1N) for 2 days. The film was washed again with water to neutral pH, and then weighted pieces were equilibrated into measured volume of 0.01N HCl, and the capacity of cationic charge was measured, by back titration with NaOH 0.05 N. Resistance and transport number were measured as described above.

Details of the anion exchange films preparation and performance are given in Table 1 below.

The film designated as 40F was obtained by casting on a glass sheet. Film thickness was 83 µm. A mixture of PPOBr with low capacity (2 meq/g) and high capacity (3 meq/g) was used, in a weight ratio of 80:20. Film 40F includes 4 layers, each layer is composed of the polymer composition specified in Table 1. Each layer was coated on the previous layer by an Applicator (Motorized Film Applicator 4340 of Elcometer company), with curing at 85° C. for 1 hour.

Film 41F was obtained by casting the polymer composition in glass dishes and curing in an oven for 1 hour at 85° C. Film thickness was 101 µm. In polymer composition 41F, 1.24 g PPOBr includes 1.116 g PPOBr with low capacity (2 meq/g) and 0.124 g PPOBr with high capacity (3 meq/g), i.e. in the ratio of 90:10.

Film 42F was obtained by free casting of the polymer composition in glass dishes and curing in an oven for 1 hour at 85° C. Film thickness was 87 µm. In polymer composition 42F, 1.24 g PPOBr includes 0.744 g PPOBr with low capacity (2 meq/g) and 0.496 g PPOBr with high capacity (3 meq/g), i.e. in the ratio of 60:40.

TABLE 1

Anion exchange membranes as self-standing films

| Film composition | Resistance ($\Omega \cdot cm^2$) | Transport number of anion, 0.1N-0.2N | Transport number, 0.5N-1N | Capacity (meq/g) |
|---|---|---|---|---|
| 40F<br>Film obtained by casting on glass.<br>1-st layer: 90% PPOBr [(2 meq/g)/(3 meq/g) = 80/20], TEA, 10% PPSUNH$_2$.<br>Layers 2-4: same as the 1-st layer.<br>Applicator V = 2, H = 200 µm | 1.4 | 0.965 | 0.873 | 1.59 (back titration) |
| 41F<br>Film obtained by casting in dish.<br>90% PPOBr [(2 meq/g)/(3 meq/g) = 90/10], TEA, 10% PPSUNH$_2$. | 2.9 | 1.01 | 0.920 | 1.15 (standard titration) |
| 42F<br>Film obtained by casting in dish.<br>90% PPOBr [(2 meq/g)/ (3 meq/g) = 60/40)], TEA, 10% PPSUNH$_2$. | 3.3 | 0.991 | 0.898 | 1.06 (standard titration) |

All the above films (shown in Table 1) had less that 3% increase in their length and width, and less than 10% increase in their thickness after immersion in a water solution for several days.

Example 3

Supported Anion Exchange Membrane Preparation

In this example, multiple layers of the anion exchange composition are coated onto an aromatic polyester fabric cloth.

Materials
THF, DMF, TEA (CP)
Methanol (technical)

Details of the anion exchange films preparation and performance are given in Table 2 below.

Membranes 40M1 and 40M2 were manufactured according to above described procedure. The mixture of PPOBr with low capacity (2 meq/g) and high capacity (3 meq/g) was used in the weight ratio of 80:20. 1.24 g of PPOBr includes 0.992 g PPOBr with low (2 meq/g) and 0.248 g PPOBr with high (3 meq/g) capacity. Membrane 40M1 consists of 2 layers of the polymers, and membrane 40M2-of 4 layers of the polymers. The PPOBr and PPSUNH$_2$ were prepared as described above.

Bromomethylation of 2,6 dimethyl polyphenylene oxide was carried out according to the procedure described in U.S. Pat. No. 4,468,501. For example, to form a Br capacity (determined by NMR) of 2.98 meq/gr, PPO 12.5 gr (0.104 moles) and 4 ml (0.075 mole) bromine were used. The amount of chlorobenzene (pure Carlo Erba) and time were 160 ml, 2 h addition at reflux and 4 h heating. To make a Br capacity (determined by NMR) of 3.7 meq/gr, PPO 25 gr (0.208 mole) and 8 ml (0.15 mole) bromine were used. The amount of chlorobenzene (pure Carlo Erba) and time were 320 ml, 3 h addition at reflux, and ½ h heating.

Preparation of Solutions 1. 1.24 g PPOBr with prescribed capacity were put into a bottle with cover, and 15 ml THF were added and stirred to full dissolution.

2. 2 ml methanol were added to dissolve the PPOBr. White gel obtained by methanol addition was dissolved by stirring.

3. After full dissolution of the gel, 0.4 ml TEA were poured into a bottle and stirred for 3 hours at room temperature to reaction performing.

4. In parallel, 140 mg PPSUNH$_2$ were put in another bottle with cover, and 8 ml DMF were added and stirred for 1 hour.

5. After 3 hours of reaction, the second bottle with PPSUNH$_2$ was poured into the first bottle with PPOBr, and mixing was continued for 1 hour.

6. The obtained mixture was used for anion exchange membranes preparation with the use of an Applicator (Motorized Film Applicator 4340 of Elcometer company).

Preparation of Membranes of Table 2

1. A commercial polyester fabric was used as membrane support. Fabric thickness was 87 µm; weight was 45.87 g/m$^2$. The fabric was used without any pretreatment. A piece of the fabric was fixed on the glass sheet with use of paper tape Perfect.

2. The glass sheet with fixed fabric was put onto an Applicator plate. 15 ml of the polymer mixture were poured along the blade to form each layer. Applicator velocity was 2, blade height was 200 µm.

3. After each layer preparation the membrane was immediately put into an oven for 1 hour at 85° C. A subsequent layer was put only on a cooled previous layer.

4. The finished membrane was removed from the glass sheet by using a bath with water, and put into a 5% solution of TEA in water for 2 days with stirring.

5. After 2 days in TEA the membrane was carefully washed in deionized water for full TEA smell removal, dried in air and then in an oven for 1 hour at 85° C.

6. Dry membrane was weighed for IEC determination and put into 1N NaOH for 48 hours. After membrane conversion to OH-form IEC was determined according to standard titration method.

TABLE 2

Supported anion exchange membranes and self-standing films

| Membrane composition | Resistance ($\Omega \cdot cm^2$) | Transport number, 0.1N-0.2N | Transport number, 0.5N-1N | Capacity (meq/g) |
|---|---|---|---|---|
| 39M2<br>Pretreatment: 1% solution PSty OH in Ethanol/H$_2$O/H$_2$SO$_4$/Glycerol | 5.0 | 0.973 | 0.868 | 0.34 |

TABLE 2-continued

Supported anion exchange membranes and self-standing films

| Membrane composition | Resistance ($\Omega \cdot cm^2$) | Transport number, 0.1N-0.2N | Transport number, 0.5N-1N | Capacity (meq/g) |
|---|---|---|---|---|
| 1-st layer: 90% PPOBr (2 meq/g), TEA, 10% PPSUNH$_2$. Layers 2-3: same as the 1-st layer. Applicator V = 2, H = 200 μm | | | | |
| 40M1 Without pretreatment. 1-st layer: 90% PPOBr [(2 meq/g)/(3 meq/g) = 80/20], TEA, 10% PPSUNH$_2$ 2-nd layer as 1-st. Applicator V = 2, H = 200 μm | 5.1 | 0.993 | 0.926 | 0.42 |
| 40M2 Without pretreatment. 1-st layer: 90% PPOBr [(2 meq/g)/(3 meq/g) = 80/20], TEA, 10% PPSUNH$_2$. Layers 2-4: same as the 1-st layer. Applicator V = 2, H = 200 μm | 3.4 | 0.999 | 0.968 | 0.68 |
| 40F Film obtained by membrane 40M2 preparation. 1-st layer: 90% PPOBr [(2 meq/g)/(3 meq/g) = 80/20], TEA, 10% PPSUNH$_2$. Layers 2-4: same as the 1-st layer. Applicator V = 2, H = 200 μm | 1.4 | 0.965 | 0.873 | 1.59 |

All the above membranes and films (in Tables 1 and 2) had less that 3% increase in their length and width and less than 10% increase in their thickness after wetting.

Example 4

To reduce polarization of the anion exchange membranes in ED, a layer is placed on the surface with a higher ion exchange capacity than the underlying layers. Thus, membrane 40M2 of Example 3 is repeated, wherein the 4$^{th}$ layer is modified such that only PPOBr with high capacity (3 meq/g) is used, in combination with the PPSUNH$_2$. In other words, the 90% PPOBr contain only the 3 meq/gr polymer (without the 2 meq/gr polymer).

Example 5

Similar to Example 4, to reduce polarization of the anion exchange membranes in ED, an additional 5$^{th}$ layer is added to membrane 40M2 of Example 3, wherein the 5th layer is modified such that only PPOBr with high capacity (3.3 meq/g) is used, in combination with the PPSUNH$_2$. In other words, the 90% PPOBr contain only a 3.3 meq/gr polymer (without the 2 meq/gr polymer).

Example 6

Similar to Example 4, to reduce polarization of the anion exchange membranes, they are coated with film 41F in Example 2. The film is coated with an additional layer of 90% PPOBr (3 meq/g), TEA and 10% PPSNH$_2$ Example 7

Example 6 is repeated, with an additional layer added, the additional layer has a composition similar to the final layer of Example 6, with the following modification: the 10% PPSUNH$_2$ is substituted with a polyphenylsulfone that contains both amino groups (1.7% N) and sulfonic groups (1.2 meq/gr). In addition, the PPOBr and SPPSUNH$_2$ are in a ratio of 50/50. A solution containing 0.2% of polymer is used for the surface coating. The final membrane has a significantly reduced fouling in the presence of humic acid commonly found in surface waters.

Example 8

Characterization of Membranes in ED Unit Cell

Figure 2:
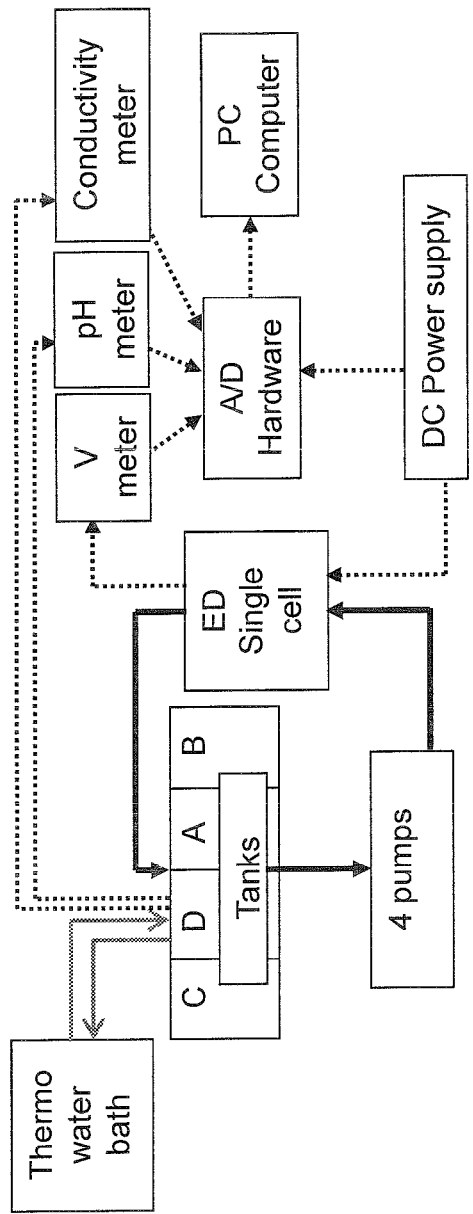
FIG. 2 shows a schematic drawing of an electrodialysis single cell system.

The anion exchange membranes were checked in a single ED cell unit according to the procedure described below. The electrodialysis single cell system, a schematic illustration of which is shown in FIG. 2, provides an instrument to examine ED ion exchange membranes. The system includes a Plexiglas® ED cell composed of a single pair of anion and cation exchange membranes providing one dialysate cell, two brine cells and two electrode cells. The single cell is connected to a DC power supply and to four tanks: two tanks for the electrodes solutions (C and A), one for the diluate (D) and one for the brine (B) (FIG. 2). The solutions in these tanks flow by pumps through the cell and back to the tanks in a batch process. In order to keep the temperature around 25° C., a thermostatic water circulation bath is connected to the diluate tank. Conductivity and pH electrodes are immersed in the diluate tank and give online measurements. The voltage of the cell is measured by reference electrodes that are connected to a multimeter. The power supply, pH meter, conductivity meter and the multimeter are connected to a PC computer that receives all the data during the experiments.

Within this unit cell, membrane 40M2 of Example 6 was tested using the Asahi Glass cation exchange membrane ("the Ashai CEM") as the counter membrane. The concentration of the diluate solutions were 0.005N and 0.01N of NaCl, and the brine concentration was 0.3N of NaCl. The linear flow velocity in all the experiments was 15 cm/sec and the membrane active area was 22.5 cm$^2$. The efficiency of salt separation, limiting current and the time of desalination were measured and compared to a unit cell where the AEM was the Asahi AMF ("the Ashai AEM") with the same counter CEM.

ED desalination was performed using a constant voltage between 0.7 to 1V. In this region, desalination using the 40M2-Ashai CEM pair was at least as effective as desalination using the two Ashai membranes. Advantageously, electrodialysis with the 40M2-Ashai CEM pair has shown lower cell resistance than the two Ashai membranes, with higher current density. The 40M2 membrane had an additional benefit—it showed a significantly lower degree of swelling, below 10%, as compared to a much higher swelling by the Asahi membranes.

Thus, the results show that AEM 40M2 is at least as good as if not better than one of the widely used commercially available AEM membrane.

Example 9

Coated Spacers

Coated spacers were prepared from polypropylene netting Vexar® (DuPont) with thickness of 0.6 mm. All spacers were pretreated in concentrated H$_2$SO$_4$ for 48 hours, carefully rinsed with deionized water and dried. Next, the spacers were immersed into 2% solution of epoxy 3M Scotch-Weld® in acetone, shaken to remove the excess solution, drained for 15 minutes and put in the oven for 1 h at 85° C. The following coating solution was used for all the samples: a 8.5% solution of PPOBr/TEA/PPSUNH$_2$ (ratio of 82/10/8 by weight) in a solution of THF/DMF (15/8 by volume). The spacers were dipped 10 times in the coating solution diluted by 50 ml THF, with a 30 min drying at 85° C. between each dip. The samples were then immersed into a 10% aqueous TMA solution for 2 days. After careful washing, the samples were conditioned in 0.01 N HCl for 2 hours to allow TMA odor removal. IEC was measured by back titration by 0.05 N NaOH. The samples were then conditioned for 7 days at 50° C. in 0.1 N NaCl. A typical IEC was 2.14 meq/gr. When this spacer was placed in the unit cell with the same membranes as described in Example 8, the time required for desalination from 0.01N to 0.004 N was shortened by approximately 40%.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed chemical structures and functions may take a variety of alternative forms without departing from the invention.

What we claim is:

1. A coating for a spacer in an electrodialysis unit, the coating comprising:
   i) a first aromatic polymer comprising cationic groups bound to an aromatic backbone of the first aromatic polymer through alkylene groups; and
   ii) a second aromatic polymer comprising aromatic amino groups, wherein an amine is directly attached to the aromatic ring;
   wherein the first aromatic polymer and the second aromatic polymer are crosslinked through an alkylene bridge between an aromatic ring of the aromatic backbone of the first aromatic polymer and the amine of the second aromatic polymer.

2. The coating of claim 1, wherein the first aromatic polymer comprising cationic groups is based on a polymer selected from the group consisting of alkylated polyphenylene oxide, alkylated polyphenylsulfone, polysulfone based on bisphenol A, alkylated polyethersulfone, alkylated polyaromatic ether ketone and aromatic alkylated polystyrene.

3. The coating of claim 1, wherein the alkylene group of the first aromatic polymer comprising cationic groups, the alkylene bridge, or both, are a short-chain alkylene containing 1 to 6 methylene groups.

4. The coating of claim 1, wherein the cationic groups are selected from the group consisting of quaternary ammonium, phosphonium and sulfonium group.

5. The coating of claim 1, wherein the ion exchange capacity of the cationic groups ranges from 0.2 to 5 meq/gr.

6. The coating of claim 1, wherein the second aromatic polymer comprising aromatic amino groups is based on an aromatic condensation polymer.

7. The coating of claim 6, wherein the aromatic condensation polymer is selected from the group consisting of polyphenylsulfone, polysulfone, polyethersulfone, polyetherketone, polyetheretherketone and polyphenylsulfide.

8. The coating of claim 1, wherein the amine content on the second aromatic polymer comprising aromatic amino groups ranges from 0.2 to 4 meq/gr.

9. The coating of claim 1, further comprising an aromatic polymer selected from an aromatic non-derivatized polymer and an aromatic polymer derivatized with hydrophobic moieties.

10. The coating of claim 9, wherein the additional aromatic polymer constitutes up to 50% of the total polymer content of the coating.

11. The coating of claim 1, wherein the first aromatic polymer comprising cationic groups, the second aromatic polymer comprising aromatic amino groups, or both, further comprises a functional group selected from the group consisting of nitro and halide groups on at least part of the aromatic rings of said first and/or second aromatic polymers.

12. The coating of claim 1, wherein the coating maintains its lateral dimensions in both dry and wet conditions to within 10%.

13. The coating of claim 1, comprising at least one layer.

14. The coating of claim 1, further comprising a surface coating made of non-charged crosslinked hydrophilic polymers or of an amphoteric film.

15. The coating of claim 14, wherein the surface coating is separated from the underlying spacer coating by a thin hydrophilic neutral layer.

* * * * *